United States Patent
Roberts et al.

(10) Patent No.: US 10,135,614 B2
(45) Date of Patent: Nov. 20, 2018

(54) INTEGRATED CONTACTLESS MPOS IMPLEMENTATION

(71) Applicant: MasterCard International Incorporated, Purchase, NY (US)

(72) Inventors: David Anthony Roberts, Appleton (GB); Patrik Smets, Nijlen (BE); Axel Emile Jean Charles Cateland, Scarsdale, NY (US); Patricia Bateson, Brussels (BE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 90 days.

(21) Appl. No.: 14/243,325

(22) Filed: Apr. 2, 2014

(65) Prior Publication Data

US 2014/0298027 A1    Oct. 2, 2014

(30) Foreign Application Priority Data

Apr. 2, 2013 (GB) .................................. 1305915.9

(51) Int. Cl.
*H04L 9/08* (2006.01)
*H04W 12/06* (2009.01)
(Continued)

(52) U.S. Cl.
CPC ........... *H04L 9/0869* (2013.01); *G06Q 20/20* (2013.01); *G06Q 20/3278* (2013.01);
(Continued)

(58) Field of Classification Search
CPC ..... H04L 9/0869; H04L 9/321; H04L 9/3271; H04L 2209/80; H04W 12/04;
(Continued)

(56) References Cited

U.S. PATENT DOCUMENTS

2002/0172359 A1* 11/2002 Saarinen ................. G06F 7/588
380/46
2004/0127256 A1* 7/2004 Goldthwaite et al. ........ 455/558
(Continued)

FOREIGN PATENT DOCUMENTS

GB    2486461 A      6/2012
GB    2506591 A  *   4/2014
(Continued)

OTHER PUBLICATIONS

Search Report dated Oct. 28, 2013, by the Intellectual Property of Great Britain in corresponding British Patent Application No. GB1305915.9. (5 pages).

*Primary Examiner* — Meng Li
(74) *Attorney, Agent, or Firm* — Buchanan Ingersoll & Rooney PC

(57) ABSTRACT

Disclosed herein is a method for performing an integrated contactless point-of-sale transaction. More particularly, there is disclose a method comprising: receiving, by a mobile device 1, a seed number from a communications network; generating, by the mobile device 1, one or more session keys, in dependence on the received seed number, for use in encrypted communication with the mobile device 1; and/or generating, by the mobile device 1, a pre-image, in dependence on the received seed number, for use in generating an unpredictable number for use in secure communication with the mobile device. Advantageously, the generation of session keys and/or a pre-image in dependence on a seed number provided to the mobile device improves the security of the system since the source of the seed number can detect incorrect session keys and/or unpredictable number derived from an incorrect pre-image.

14 Claims, 20 Drawing Sheets

(51) Int. Cl.
*H04W 12/04* (2009.01)
*H04L 9/32* (2006.01)
*G06Q 20/20* (2012.01)
*G06Q 20/32* (2012.01)
*G06Q 20/38* (2012.01)

(52) U.S. Cl.
CPC ......... *G06Q 20/3829* (2013.01); *H04L 9/321* (2013.01); *H04L 9/3271* (2013.01); *H04W 12/04* (2013.01); *H04W 12/06* (2013.01); *H04L 2209/80* (2013.01)

(58) Field of Classification Search
CPC .............. H04W 12/06; G06Q 20/3829; G06Q 20/3278; G06Q 20/20
See application file for complete search history.

(56) References Cited

U.S. PATENT DOCUMENTS

| | | | | |
|---|---|---|---|---|
| 2006/0190726 A1* | 8/2006 | Brique et al. | ................. | 713/168 |
| 2007/0198856 A1* | 8/2007 | Lee et al. | ..................... | 713/190 |
| 2007/0233615 A1 | 10/2007 | Tumminaro | | |
| 2008/0041936 A1 | 2/2008 | Vawter | | |
| 2009/0144202 A1 | 6/2009 | Hurry | | |
| 2010/0287585 A1* | 11/2010 | Frondal | ................... | H04N 7/162 725/31 |
| 2011/0093710 A1* | 4/2011 | Galvin | ................... | H04L 63/061 713/169 |
| 2011/0208965 A1* | 8/2011 | Machani | ............. | H04L 63/0435 713/168 |
| 2011/0270759 A1* | 11/2011 | Peart et al. | ..................... | 705/44 |
| 2012/0298747 A1* | 11/2012 | Mestre | .......................... | 235/380 |
| 2013/0081101 A1* | 3/2013 | Baer et al. | ........................ | 726/1 |
| 2013/0136258 A1* | 5/2013 | Grube | ....................... | H04L 9/14 380/44 |
| 2013/0198518 A1* | 8/2013 | Ran | ........................ | H04L 9/0861 713/170 |
| 2014/0037093 A1* | 2/2014 | Park et al. | ..................... | 380/277 |

FOREIGN PATENT DOCUMENTS

WO WO 9925086 A2 * 5/1999
WO 2013/074631 A2 5/2013

* cited by examiner

INTEGRATED CONTACTLESS MPOS IMPLEMENTATION

FIELD OF THE INVENTION

The present invention relates to the implementation of mobile point-of-sale system. More particularly, but not exclusively, it relates to the implementation of a mobile point-of-sale system in which a mobile device of a merchant performs secure contactless transactions with a payment device of a customer.

BACKGROUND TO THE INVENTION

There has recently been a lot of development in the field of mobile point-of-sale, MPOS, solutions. A MPOS solution, that may alternatively be referred to as a MPOS device, allows a merchant to use a mobile device as a point-of-sale, POS, terminal for performing payment transactions. Suitable such MPOS mobile solutions are typically multi-purpose mobile computing platforms and include feature phones, smart phones, tablets, and PDAs.

Advantages of merchants using a MPOS solution for performing transactions include the following:

Lower total cost of ownership. A MPOS solution can be offered either for free or at a very low cost. Many merchants already own suitable mobile solutions so they can avoid additional costs that would be incurred from purchasing, deploying and maintaining a MPOS terminal.

Greater portability and ease of use. These are important factors, in particular for merchants with no fixed place of business.

More flexible software development platforms. Flexible software development platforms can be integrated with existing and future systems.

Better user interfaces for both the merchant and the customer.

Simplicity and interoperability of the MPOS solution.

A known way of providing a merchant with a MPOS solution is through the use of a MPOS card reader accessory. A MPOS card reader accessory attaches to a port of a mobile device, such as the audio port, USB port or a proprietary connector on the mobile device. It is also possible for a MPOS card reader accessory to connect to the mobile device via Bluetooth. Accessories provide for magnetic stripe, EMV (Europay®, Mastercard® and Visa®) chip and contactless acceptance, and are sometimes referred to as "dongles" or "sleeves".

An example of a MPOS card reader accessory being used with a merchant's mobile device and a customer's card is shown in FIG. 1a.

Another implementation of MPOS is integrated contactless MPOS, IC-MPOS. IC-MPOS allows contactless transactions via a near field communication (NFC) antenna within the merchant's mobile device with, for example, a suitably enabled customer's mobile device that is being used in place of a standard payment card or a contactless payment card.

FIG. 1b shows mobile devices for an IC-MPOS transaction. Payment is possible between a merchant's mobile device and a customer's mobile device over a wireless communication link.

Before IC-MPOS is considered in more detail, a brief overview of the parties and service providers in a payment system is provided.

In order to correctly perform a financial transaction, it is necessary to correctly manage the information transfer between cardholders, issuers, acquirers, payment facilitators merchants and/or sub-merchants.

MPOS solution providers may offer their products to merchants via the traditional acquiring channel. In these cases, the merchant maintains a direct relation with a licensed acquirer and simply uses the MPOS solution as an alternative to the traditional POS terminal.

Alternatively, MPOS solution providers may make use of the payment facilitator model, such as the MasterCard® payment facilitator model shown in FIG. 2. In such a model, the payment facilitator has a direct merchant agreement with a licensed acquirer. The payment facilitator sells services to sub-merchants and manages the settlement of funds.

Information transfer between all of the different parties and service providers must be correctly managed and adhere to specific rules, requirements and laws.

Although the above has been described with reference to MasterCard®, it will be understood that other service providers implement similar models and face similar problems, namely how to correctly manage the transfer of information within a payment system.

One of the most important considerations when implementing IC-MPOS, is to ensure that the security of sensitive information and the integrity of processing is maintained and the system is not vulnerable to being attacked by malicious parties.

Unlike a dedicated POS device, a mobile device is far more vulnerable to malware and unauthorised software modifications. An IC-MPOS solution provider, or service provider, is required to support a very large number of different mobile devices, from unknown sources, that also execute other applications unknown to, and unauthorised by, the IC-MPOS provider.

Attacks may be performed during any of the logon, initialization, transaction processing and logout phases of a mobile device in an IC-MPOS system of an IC-MPOS solution.

Modifications to an IC-MPOS system by a malicious party may be with the aim of:

Capturing or modifying transaction data (Man In the Middle)

Acting as a relay attack to non MPOS merchants

Acting as a relay attack from MPOS merchants

The above list is not exhaustive and other malicious actions exist.

Modifications can be done on the front-end software i.e. the software responsible for providing the interaction with the card and the customer, the back-end software i.e. the software responsible for interacting with the Server and the Merchant, a combination of the above.

The entity performing the modifications can be:

the Merchant the customer a 3$^{rd}$ party

A fraudulent Merchant is a known threat. For regular brick-and-mortar shops, the acquirer would shut down the Merchant but this may be more difficult for MPOS. The non-fraudulent nature of the Merchant needs to be ensured by the Logon and/or transaction processes.

If the customer is the actual fraudster, then a distinction is drawn between (in order of priority):
(1) Fraud committed with a fake card.
(2) Fraud committed with a genuine stolen card. The protection against lost and stolen has to come from the card and the issuer. To protect the Merchant, we have to ensure that CVM cannot be bypassed when transactions are above the CVM limit.
Bypassing CVM can be done through
   Manipulation of the Terminal so that it uses "No CVM" for the transaction.
   Faking the CVM
      Signature—up to the Merchant, there is little that can be done from a technical perspective
      m-PIN—a discrepancy between Terminal's view and the card's view on CVM can be detected by
         validating the CDA signature (by MPOS)
         checking the CVR (by issuer)
(3) Fraud committed with a genuine card that is in the hands of the rightful owner (first party fraud)—once detected, it can be traced back to the fraudster and the specific account; so easy to contain.

For $3^{rd}$ party fraud, this is best prevented by strong authentication and data encryption.

No known IC-MPOS systems have strong security features and have strong resistance against the above-described fraudulent activities.

A further problem is that when implementing an IC-MPOS system, the mobile device used by the merchant must be allowed to run other applications that support its user interface and other functions of the mobile device. An IC-MPOS application is required to operate on the mobile device through its main and terminal applications. However, there is other software executed by the mobile device that is not known to, authorised by, and cannot be trusted by the server supporting payments with the mobile device. Protection is therefore required from other applications on the mobile device as these may contain malware.

In addition, there are known systems that transmit unpredictable numbers in communications in order to improve their security. However, such known systems can have their security compromised by the transmitted unpredictable numbers actually being predictable by a malicious party.

The documents listed in Tables 1, 2 and 3 are relevant to the implementation of payment systems, in particular contactless payment systems, and are incorporated herein in their entirety by reference.

TABLE 1

| Reference | Document Title |
| --- | --- |
| [EMV Book 2] | *Integrated Circuit Card Specifications for Payment Systems-Book 2, Security and Key Management*, Version 4.3, November 2011 |
| [EMV Book 3] | *Integrated Circuit Card Specifications for Payment Systems-Book 3, Application Specification*, Version 4.3, November 2011 |
| [EMV Book 4] | *Integrated Circuit Card Specifications for Payment Systems-Book 4,Cardholder, Attendant, and Acquirer Interface Requirements*, Version 4.3, November 2011 |
| [EMV Book A] | *EMV Contactless Specifications for Payment Systems, Book A-Architecture and General Requirements*, Version 2.2 |
| [EMV Book D] | *EMV Contactless Specifications for Payment Systems, EMV Contactless Communication Protocol Specification*, Version 2.2 |

TABLE 1-continued

| Reference | Document Title |
| --- | --- |
| [READER] | *EMV Contactless Specifications for Payment Systems, Book C-2 Kernel 2 Specification* Version 2.2 June 2012; available from emvco.com website |
| [ISO/IEC 7816-4] | Identification cards-Integrated circuit(s) cards with contacts-Part 4: Organization, security and commands for interchange |
| [ISO/IEC 19772] | Information technology-Security techniques-Authenticated encryption. ISO/IEC FDIS 19772, 2008 Jul. 04 |
| [ISO/IEC 18033-2] | Information technology-Security techniques-Encryption algorithms-Part 2: Asymmetric ciphers |
| [ISO/IEC 9797-2] | Information technology-Security techniques-Message Authentication Codes (MACS)-Part 2: Mechanisms using a dedicated hash-function |
| [IETF RFC4226] | HOTP: An HMAC-Based One-Time Password Algorithm IETF RFC 4226, December 2005 |

TABLE 2

| Document | Content |
| --- | --- |
| mastercard.com/corporate/mpos.html | Details on the MasterCard ® Mobile Point of Sale (MPOS) Program |
| mastercard.com/us/company/en/docs/MasterCard_Mobile_Point_Of_Sale_Best_Practices.pdf | MasterCard ® best practices for Mobile Point of Sale Acceptance |

TABLE 3

| Document | Content |
| --- | --- |
| pcisecuritystandards.org/documents/Mobile%20Payment%20Security%20Guidelines%20v1%200.pdf | PCI Mobile Payment Acceptance Security Guidelines |

SUMMARY OF THE INVENTION

Embodiments overcome at least some of the above-described problems and advantageously allow the implementation of IC-MPOS with strong security features and strong resistance against malicious and fraudulent activities.

According to a first aspect of the invention, there is provided a method for secure communication with a mobile device, the method comprising: receiving, by a mobile device, one or more seed numbers from a communications network; generating, by the mobile device, one or more session keys, in dependence on one or more of the received one or more seed numbers, for use in encrypted communication with the mobile device; and/or generating, by the mobile device, a pre-image, in dependence on one of the received one or more seed numbers, for use in generating an unpredictable number for use in secure communication with the mobile device.

Advantageously, during communication with the mobile device, the one or more session keys and/or pre-image generated by the mobile device can also be generated by the source of the one or more seed numbers. The source of the one or more seed numbers is therefore able to detect incorrect session keys as well as an unpredictable number derived from an incorrect pre-image.

Preferably, the method further comprises: generating, by a server, the one or more seed numbers; and transmitting, by the server, the one or more seed numbers to the mobile device over the communications network.

Advantageously, the server is the source of the seed number and is able to recognise incorrect session keys as well as an unpredictable number derived from an incorrect pre-image and to thereby prevent fraudulent activity.

Preferably, the mobile device comprises a reader, optionally located in a secure zone of the mobile device, and a terminal, the method further comprising: communicating between the reader and the server via the terminal.

Advantageously, the terminal is able to run applications that allow communication with and support the user interface of the mobile device. There may also be further applications in the terminal that are unknown to the service provider and potentially malicious. Security against such malicious applications is provided when the reader is located in a secure part of the mobile device.

Preferably, the method further comprises: generating, by the reader, said one or more session keys and/or said pre-image.

Advantageously, the one or more session keys and/or pre-image are protected against any malicious application in the terminal.

Preferably, the method further comprises: receiving, by the server, a log on request from the terminal of the mobile device; authenticating, by the server, the terminal from the information comprised in the received log on request; and transmitting, by the server in response to successful authentication of the terminal, said one or more seed numbers to the terminal.

Advantageously, security is improved since the mobile device only receives a seed number if it is authenticated by the server.

Preferably, said log on request comprises information dependent on at least one of a sequence counter, a password of a first user, identification information of a second user, identification information of the first user, identification information of the terminal and date and time information of the log on request, and the method comprises: authenticating, by the server, the log on request using its own version of information dependent on at least one of a sequence counter, a password of the first user, identification information of the second user and identification information of the first user.

Advantageously, security is improved by the server using such information to authenticate the terminal.

Preferably, authenticating the terminal by the server comprises: comparing date and time information comprised in the received log on request from the terminal with date and time information of the last successful log on stored in the server; and authenticating the terminal only if the date and time of the received date and time request is later than the date and time of the last successful log on request.

Advantageously, the server is protected against malicious attacks based on previous log on information.

Preferably, authenticating the terminal by the server comprises: comparing date and time information comprised in the received log on request with the current date and time; and authenticating the terminal only if the magnitude of the difference between the date and time information comprised in the received log on request and the current date and time is less than a predetermined threshold.

Advantageously, security is improved by preventing log on requests that have taken a long time to reach the server. Such a delay in transmission time may be a result of malicious activity.

Preferably, the method further comprises: transmitting, by the server in response to each successful authentication of the terminal, one or more seed numbers to the terminal, wherein each seed number is a new seed number.

Advantageously, security is improved since even if a malicious party was able to obtain the seed number(s) used in a session, the obtained seed number(s) would be of no use in other sessions.

Preferably, the method further comprises: transmitting, by the terminal, information comprising the one or more seed numbers received from the server to the reader; generating, by the reader, a random number; generating, by the reader, a first session key in dependence on a first part of the random number and one of the received one or more seed numbers; and generating, by the reader, a second session key in dependence on a second part of the random number and one of the received one or more seed numbers.

Advantageously, generating the session keys in dependence on random information improves their security.

Preferably, the reader generates the first session key and the second session key in dependence on the same received seed number.

Advantageously, only one seed number is required.

Preferably said information comprising the one or more seed numbers comprises information dependent on the password of the first user, identification information of the second user, identification information of the first user, identification information of the terminal and said one or more seed numbers.

Advantageously, security is improved since the reader is able to use the information in further communications.

Preferably, the method comprises: encrypting, by the reader with the public key of the server, information comprising said random number; and transmitting, by the reader, the encrypted information to the server via the terminal.

Advantageously, this provides the server with sufficient information to generate the same session keys as the reader.

Preferably, the method comprises: generating, by the reader, said information comprising said random number by concatenating the random number with information dependent on at least one of the password of the first user, identification information of the second user, identification information of the first user and identification information of the terminal and the seed number.

Advantageously, security is improved since the information can be used by the server to authenticate the received information.

Preferably, the method further comprises: generating, by the reader, said pre-image in dependence on one of the received one or more seed numbers from the server and identification information of the reader; and generating a first unpredictable number in dependence on the generated pre-image.

Advantageously, the generated unpredictable number is recognisable by the source of the seed number.

Preferably the reader generates said pre-image and at least one of the session keys in dependence on the same received seed number.

Advantageously, the number of required seed numbers is reduced.

Preferably, the identification information of the reader is known to the reader and the server prior to any log on or transaction operation being performed; and the identification information of the reader is not transmitted to or from the mobile device over the communications network during any log on or transaction operation.

Advantageously, a malicious party that receives the wireless communication with the mobile device is unable to obtain the information required to generate the unpredictable numbers since the identification information of the reader is not transmitted.

Preferably, after the reader has generated the first and second session keys and the first pre-image, the method further comprises the reader: erasing the stored version of the one or more seed numbers in the reader; erasing the stored version of the random number in the reader; erasing the stored version of the first part of the random number in the reader; and erasing the stored version of the second part of the random number in the reader.

Advantageously, security is improved by not storing sensitive information that is no longer required.

Preferably, the method further comprises: receiving, by the reader, third user data from a device of a third user.

Advantageously, since this allows a lot of flexibility in how the mobile device obtains the customer payment data, contactless payment transactions can be realised.

Preferably, the method further comprises: generating, by the reader, a new pre-image in dependence on the pre-image, the value of a transaction sequence counter and received third user data used for the previous transaction; and generating, by the reader, a new unpredictable number for use in the next transaction in dependence on said new pre-image.

Advantageously, a fresh unpredictable number is generated for each transaction with the server retaining its ability to verify the freshness of the unpredictable number.

Preferably, the method further comprises: generating, by the reader, transaction data for the current transaction comprising information dependent on the unpredictable number generated by the reader, the value of a transaction sequence counter and received third user data; encrypting, by the reader, the generated transaction data with the second session key; and transmitting, by the reader, the encrypted transaction data to the server via the terminal.

Advantageously, the security of transaction data is improved by both the use of an unpredictable information and the sequence of transactions.

Preferably, the method further comprises: generating transaction data by the reader; generating, by the reader, sanitized transaction data by removing and/or replacing some of the information in the generated transaction data; and transmitting the sanitized transaction data to the terminal.

Advantageously, information transmitted from the reader for use by the terminal, such as to confirm that there has been a successful transaction, has been sanitized and does not comprise sensitive information.

Preferably, the method comprises: receiving, by the server, encrypted information comprising said random number; decrypting, by the server with the private key of the server, the received encrypted information to obtain said random number; generating, by the server, the first session key in dependence on the first part of the random number and one of the one or more generated the seed numbers; and generating, by the server, the second session key in dependence on the second part of the random number and one of the one or more generated the seed numbers.

Advantageously, the server generates the same session keys as those generated by the reader.

Preferably, said encrypted information comprising said random number comprises the random number and information dependent on at least one of the one or more seed numbers, a password of the first user, identification information of the second user, identification information of the first user and identification information of the terminal, and the method comprises: generating, by the server, its own version of information dependent on at least one of the one or more seed numbers, a password of the first user, identification information of the second user, identification information of the first user and identification information of the terminal; and validating, by the server, the received information by comparing the received and its own versions of information dependent on at least one of the one or more seed numbers, a password of the first user, identification information of the second user, identification information of the first user and identification information of the terminal.

Advantageously, security is improved due to the information that the authentication of the received communication by the server is dependent on.

Preferably, the method comprises: generating, by the server, the pre-image in dependence on one of the one or more seed numbers and identification information of the reader; and generating, by the server, the first unpredictable number in dependence on said pre-image.

Advantageously, the server generates the same unpredictable number as that generated by the reader.

Preferably, the method comprises: generating, by the server, a new pre-image in dependence on the pre-image, the value of a transaction sequence counter and received third user data used in the previous transaction; and generating, by the server, a new unpredictable number for use in the next transaction in dependence on said new pre-image.

Advantageously, the server retains its ability to verify the freshness of the unpredictable number used in the current transaction.

Preferably, the method comprises: receiving, by the server, encrypted transaction data generated by the reader; decrypting the received transaction data using the second session key; comparing the received value of the transaction sequence counter with the value of a transaction sequence counter stored in the server; comparing the received unpredictable number with the unpredictable number generated by the server for the current transaction; and authorising the transaction in dependence on the comparison of the received value of a transaction sequence counter with the value of a transaction sequence counter stored in the server and the comparison of the received unpredictable number with the unpredictable number generated by the server for the current transaction.

Advantageously, the server is able to detect incorrect transaction information, that is potentially caused by fraudulent activity, from both the value of a transaction sequence counter and an unpredictable number generated by the server.

Preferably, the method comprises: transmitting, by the reader to the server via the terminal, transaction data in the same sequence order that the transactions are performed.

Advantageously, this allows the sequence order of transactions to be used to detect incorrect or fraudulent activity.

Preferably, the method comprises: generating, by the server, a nonce in dependence on current values of at least one of a reader message counter and server message counter stored in the server; and transmitting, by the server, a message comprising the nonce to the terminal.

Advantageously, use of a nonce that is dependent on a counter value improves the security of the system. In addition, the same nonce is not transmitted twice since a counter value will change after a nonce is transmitted.

Preferably, the method comprises: receiving, by the terminal, a logout instruction; sending, by the terminal, any pending instructions to the server; and sending, by the terminal, a request to the reader to erase the pre-image, unpredictable number and session keys stored therein.

Advantageously, when a session ends, pending transactions are correctly completed and sensitive information in the reader is deleted when it is no longer required.

Preferably, the method comprises: receiving, by the server, a logout instruction; completing, by the server, transactions currently in progress; and erasing, by the server, the pre-image and session keys stored therein.

Advantageously, when a session ends, pending transactions are correctly completed and sensitive information in the server is deleted when it is no longer required.

According to a second aspect of the invention, there is provided method of operating a server for secure communication with a mobile device, the method comprising: receiving a log on request from a mobile device; authenticating the mobile device from the received log on request; transmitting, in response to successful authentication of the mobile device, one or more seed numbers to the mobile device; receiving, from the mobile device in response to the server transmitting said one or more seed numbers to the mobile device, encrypted information comprising a random number; decrypting the received encrypted information to obtain said random number; generating one or more session keys, in dependence on said random number and one or more of said one or more seed numbers, for encrypted communication with the mobile device; and/or generating a pre-image, in dependence on one of said one or more seed numbers and identification information of the mobile device, wherein said pre-image is for use in generating an unpredictable number for use in secure communication with the mobile device.

Advantageously, one or more session keys and pre-image generated by a mobile device for secure communication between it and a server can also be generated by the server. The server is therefore able to recognise incorrect session keys as well as an unpredictable number derived from an incorrect pre-image.

According to a third aspect of the invention, there is provided a method for secure communication with a mobile device, the mobile device comprising a reader located in a secure zone of the mobile device and a terminal, the method comprising: communicating with the mobile device through the terminal, such that communication with the reader is via the terminal; generating, by the reader, one or more session keys for use in encrypted communication with the mobile device; and/or generating, by reader, a pre-image for use in generating an unpredictable number for use in secure communication with the mobile device.

Advantageously, the reader provides a secure zone of the mobile device for operations that involve sensitive information so that such sensitive operation is protected from any malware that may be present in the terminal of the mobile device.

Preferably, the method of the third aspect further comprises: receiving, by the terminal, third user data from a device of a third user; and transmitting, by the terminal, the third user data to the reader.

Advantageously, the reader is provided with data from a source that is external of the mobile device.

Preferably, the method of the third aspect further comprises: receiving, by the reader, third user data from the terminal; generating, by the reader, an unpredictable number in dependence upon a pre-image generated by the reader; generating, by the reader, secure transaction data in dependence upon the received third user data and the unpredictable number; generating, by the reader, encrypted transaction data by encrypting the secure transaction data using a session key generated by the reader; and transmitting the encrypted transaction data to a server via the terminal.

Advantageously, the encrypted transaction data transmitted from the mobile device is generated within the secure zone provided by the reader.

Preferably, the method of the third aspect comprises: generating, by the reader, sanitized transaction data by removing and/or replacing some of the information in the secure transaction data; and transmitting the sanitized transaction data to the terminal.

Advantageously, the terminal receives data representative of a transaction but, since the data has been sanitized, security is not compromised.

Preferably, the method of the third aspect further comprises: receiving, by the server, encrypted transaction data and sanitized transaction data transmitted by the terminal; authenticating, by the server, both the reader and the terminal in dependence on the received encrypted transaction data and sanitized transaction data.

Advantageously, the server is able to authenticate both the reader and the terminal of the mobile device from the received encrypted transaction data and sanitized transaction data.

According to a fourth aspect of the invention, there is provided a mobile device comprising processing and operating means with executable instructions which on execution cause the mobile device to perform any of the above-described methods of a mobile device and thereby realise some or all of the above-described advantages.

According to a fifth aspect of the invention, there is provided server comprising processing and operating means with executable instructions which on execution cause the server to perform any of the above-described methods of a server and thereby realise some or all of the above-described advantages.

According to a sixth aspect of the invention, there is provided a mobile communications system comprising a server and a mobile device with executable instructions which on execution cause the sever and mobile device to perform any of the above-described methods and thereby realise some or all of the above-described advantages.

According to a seventh aspect of the invention, there is provided a computer readable medium for a mobile device comprising computer executable instructions which on execution cause a mobile device to perform any of the above-described methods of a mobile device and thereby realise some or all of the above-described advantages.

According to an eighth aspect of the invention, there is provided computer readable medium for a server comprising computer executable instructions which on execution cause a server to perform any of the above-described methods of a server and thereby realise some or all of the above-described advantages.

LIST OF FIGURES

Embodiments of the invention will now be described, by way of example only, with reference to the accompanying drawings, in which.

EMBODIMENTS

Figure 1A:
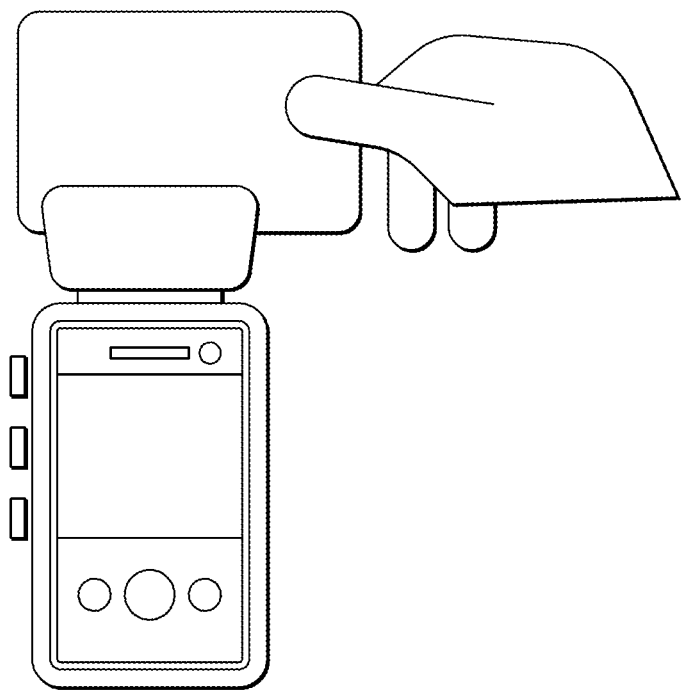
FIG. 1a shows a mobile device reading a card with a card accessory attached to the mobile device.
Figure 1B:
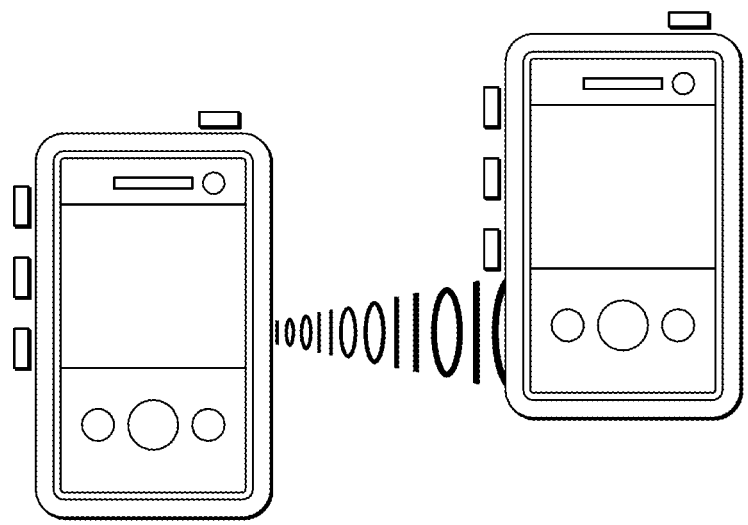
FIG. 1b shows a merchant's mobile device, the IC-MPOS solution communicating with a customer's mobile device in an IC-MPOS system.
Figure 2:
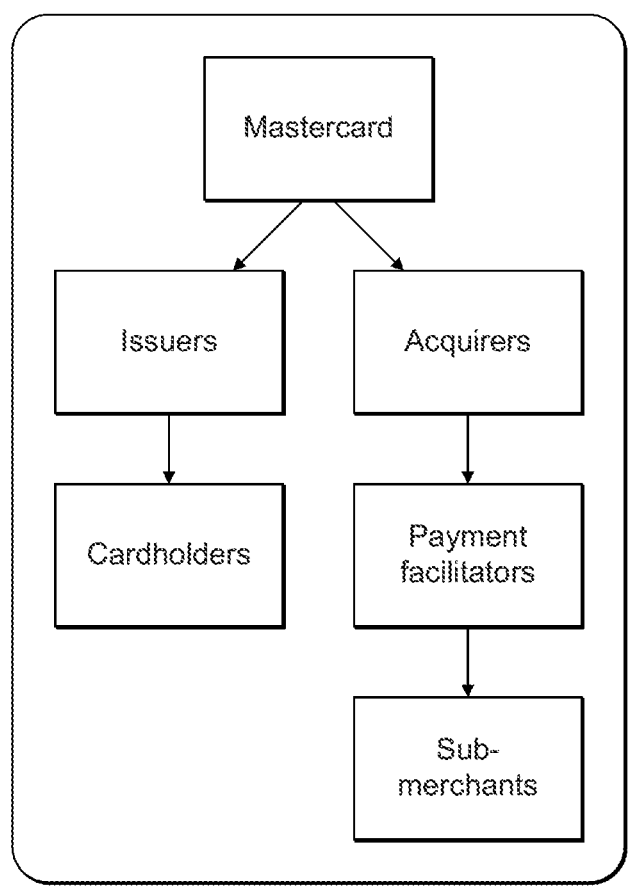
FIG. 2 shows the MasterCard® payment facilitator model.

Embodiments provide an implementation of an IC-MPOS system with strong security features and strong resistance against fraudulent activity.

Embodiments preferably provide a version of Master-Card's Pay Pass® implemented in a MasterCard® system model. However, embodiments are in no way limited to MasterCard® applications and systems and embodiments also apply to applications and systems of any other IC-MPOS service provider.

1. Overview of Embodiments and Related Documents

Before detailed descriptions of embodiments are provided, the following definitions of terms used throughout the present document are provided:

Mobile Device (or mobile device) 1=A consumer device with connectivity to a Server 4. Examples are a mobile phone and a tablet.

Mobile Point-of-Sale, MPOS (or mobile point-of-sale)=A type of mobile payment solution with the mobile device 1 being used as a merchant point-of-sale Terminal 2.

Integrated contactless MPOS, IC-MPOS=An MPOS using the NFC antenna inside the mobile device 1. To be distinguished from other MPOS solutions that use a separate card reader (MagStripe or chip reader, NFC antenna) on a MPOS card reader accessory, such as a dongle/attachment, where the processing is securely managed on the accessory.

MPOS Solution Provider/MPOS Service Provider (or MPOS solution provider/MPOS service provider)=Provider of a MPOS Solution or Service. This role can be filled in by an acquirer or a Payment Facilitator. The terms MPOS Solution Provider and MPOS Service Provider are used herein to refer to either the entity that has developed the solution, the entity offering the solution to merchants, or both.

Payment Facilitator (or payment facilitator)=An entity having a direct merchant agreement with a licensed acquirer, selling services to sub-merchants and managing the settlement of funds. The licensed acquirer may be, for example, a MasterCard® licensed acquirer.

Merchant (or merchant)=Entity having signed an agreement with a licensed acquirer or a Payment Facilitator to have access to services that allow acceptance of Cards or mobile PayPass devices as means of payment in exchange for goods and services rendered.

Clerk (or clerk)=Person operating the IC-MPOS on behalf of the Merchant.

MPOS System (or MPOS system)=The MPOS System is the collective term given to the payment infrastructure needed to be able to use a mobile device 1 as a merchant point-of-sale Terminal 2. It is made up of the mobile device 1 itself, including Terminal 2 and Reader 3, and the MPOS Solution Provider operating the Server 4.

Reader (or reader) 3=The Reader 3 is the logical entity in the MPOS System that supports the Kernel(s) and provides the contactless interface used by the Card. It is located in the mobile device 1.

Terminal (or terminal) 2=The Terminal 2 is the logical entity that captures the transaction type and the transaction amount, connects to the Server 4 and is used to display information. It is located in the mobile device 1.

Server (or server) 4=Server is used to indicate the physical device as well as the logical entity that connects to the Terminal 2 on one side and to the Acquirer on the other side. It is responsible for logon of the merchant, initialization of the mobile device 1 and validation and authorization of the payment transactions. It is located at the MPOS Solution Provider.

The requirements and scenarios of IC-MPOS according to embodiments is overviewed below.

A mobile device 1 is typically used as a contactless point of sale for completing transactions in the following model:

- A merchant is registered with a MPOS Service Provider; this registration includes a link to an acquirer and an account with this acquirer.
- Several employees or clerks may be servicing customers at this merchant (location) and accept payment through multiple mobile devices.
- Each clerk is registered (under the merchant heading) with the MPOS Solution Provider and has its own credentials and user rights.
- Mobile devices are not bound to clerks and a clerk may use a different device at different times.
- Mobile devices support the same applications (=software) and support different configurations (=data), depending on the capabilities of the mobile device 1 and the user rights of the clerk that is using it.

With the above model, a typical scenario or use case for a clerk is the following:

(1) At the beginning of the day, an employee (the clerk) takes a(ny) mobile device 1 supporting the application and logs into the MPOS Solution Provider from the application installed on the mobile device 1. A device can be successively used by different clerks and a clerk can use successively different devices. However, at any given time, a clerk can be logged in on only one device and no-one else can be logged in from this same device.

(2) When the mobile device of a clerk logs into the MPOS Service Provider, the device is configured for the clerk before any transaction can happen. As this initialization also includes some critical security parameters, it has to be executed at least once a day, even if the clerk didn't log out in the meantime.

(3) Once the device is initialized, a clerk will be able to accept contactless payments. This payment will follow the following steps:

a. The clerk enters the payment amount (or this amount is fixed and predefined)

b. The cardholder verifies this amount and presents their card or mobile phone for contactless reading c. The device confirms that the contactless reading was successful with a visual signal, audio signal or both.

d. If the transaction requires it, the cardholder signs a paper receipt, directly signs on the device's touch screen or enters their mPIN on their mobile phone (which is used as a card).

e. The device checks the transaction with the Server 4. If the Server 4 is not reachable, the clerk (depending on configuration settings) can accept or decline the transaction locally. When the connection is restored, the device will upload locally accepted transactions to the Server 4.

f. The outcome of the transaction (accepted or rejected) is displayed and confirmed to the merchant and the cardholder.

g. The cardholder may receive an e-receipt, by email or SMS.

(4) At the end of the day, the clerk logs off.

The different functional components can be located in a Terminal 2 and Reader 3 application (in the mobile device 1) and a Server 4 application (located at the MPOS Solution Provider).

The use case above illustrates different phases for Terminal 2, Reader 3 and Server 4. For the purpose of the present document, there are the following phases:

Merchant and device registration
Logon of the clerk
Initialization of the Terminal 2 and Reader 3 in the mobile device 1
Transaction processing
Logoff A brief overview of the implementation of IC-MPOS according to embodiments is provided below.

On a mobile device 1, used by a merchant in the IC-MPOS system according to embodiments, separate entities are provided known as Terminal 2 and Reader 3.

The Terminal 2 is used for general operations such as managing the user interface of the mobile device 1 and communications to and from the mobile device 1. The Terminal 2 need not be implemented in a secure zone of the mobile device 1 and may execute other applications that have not been authorised by the IC-MPOS service provider.

The Reader 3 is preferably implemented in a secure zone of the mobile device 1. By implementing the Reader 3 in secure zone, or alternatively in an associated component such as a Secure Element, security is improved. An alternative implementation has the Reader 3 located outside of a secure zone. The Reader 3 receives customer information required for performing a transaction through a contactless information transfer operation and encrypts the received information for transmission by the Terminal 2 to a Server 4.

The Server 4 is external of the mobile device 1 and information is transferred between the Server 4 and mobile device 1 over any kind of wireless communication network. The Server 4 is in communication with the systems of any parties required to implement a payment transaction by the IC-MPOS system. Although all communication from the mobile device 1 is performed through the Terminal 2, any sensitive payment information for transmitting from the Reader 3, via the Terminal 2, to the Server 4 is encrypted within the Reader 3 so that it is not vulnerable when it is passed through the Terminal 2. Payment related information transmitted from the Reader 3 to the Terminal 2 for use by the Terminal 2, such as a confirmation of a successful transaction, is sanitized by the Reader 3 before being transmitted to the Terminal 2 so that sensitive information is not transmitted to the Terminal 2.

Advantageously, by separating the Terminal 2 and Reader 3 functions on the mobile device 1 and, in particular, implementing the Reader 3 functions in a secure zone of the mobile device 1, the IC-MPOS implementation has strong security against any malware that may be present on the mobile device 1.

When the Reader 3 sends encrypted sensitive information to the Server 4, within the data sent by the Reader 3 is an unpredictable number, UN. The Server 4 is able to verify that the UN is correct for a non-fraudulent transaction but is unable to predict UNs that will be used in future transactions. The Server 4 can therefore detect a malicious operation by monitoring the received UNs and detecting a replay attack if the same UN is received twice or if the received unpredictable number is not the same as that calculated by the Server 4 for a specific transaction.

The implementation of IC-MPOS according to embodiments further improves the security of the system in the way that the UNs and session keys for encrypted communication are generated. As part of the log-on process, the Server 4 generates a seed number that is unique to that particular session and the seed number is sent to the Reader 3. The UN generated by the Reader 3 is dependent upon the seed number received from the Server 4. The Reader 3 then generates security encryption keys for the communication between the Server 4 and Reader 3, and vice versa, in dependence upon the seed information received from the Server 4 as well as a random number generated by the Reader 3. The random number is then transmitted to the Server 4, using public/private encryption keys known to the Reader 3 and Server 4, and the Server 4 generates the same session keys. The UN used in a transaction is dependent upon customer data. When encrypted transaction information from the Reader 3 is received by the Server 4, the Server 4 decrypts the received information using a session key to obtain the UN. The Server 4 also generates its own version of a UN for the transaction currently in progress, using received customer data, for comparison with the UN received from the Reader 3. Advantageously, the freshness of the UN is therefore verified by the Server 4.

Advantageously, the Server 4 is only able to verify the freshness of the UN for the current transaction. UNs generated by the Reader 3 for future transactions, cannot be predicted by the Server 4 and so the security provided by the communication of a UN from the Reader 3 to the Server 4 is not compromised.

A more detailed description of the implementation of an IC-MPOS system according to embodiments is provided in Sections 2 to 13 below.

Embodiments include logon, initialization, transaction processing and logout operations in an IC-MPOS.

Merchant (de)registration and device (de)registration (by the MPOS Solution Provider) are not specifically addressed by the present document.

Service provisioning or goods dispensing at the merchant are also not specifically addressed by the present embodiment.

Figure 3:
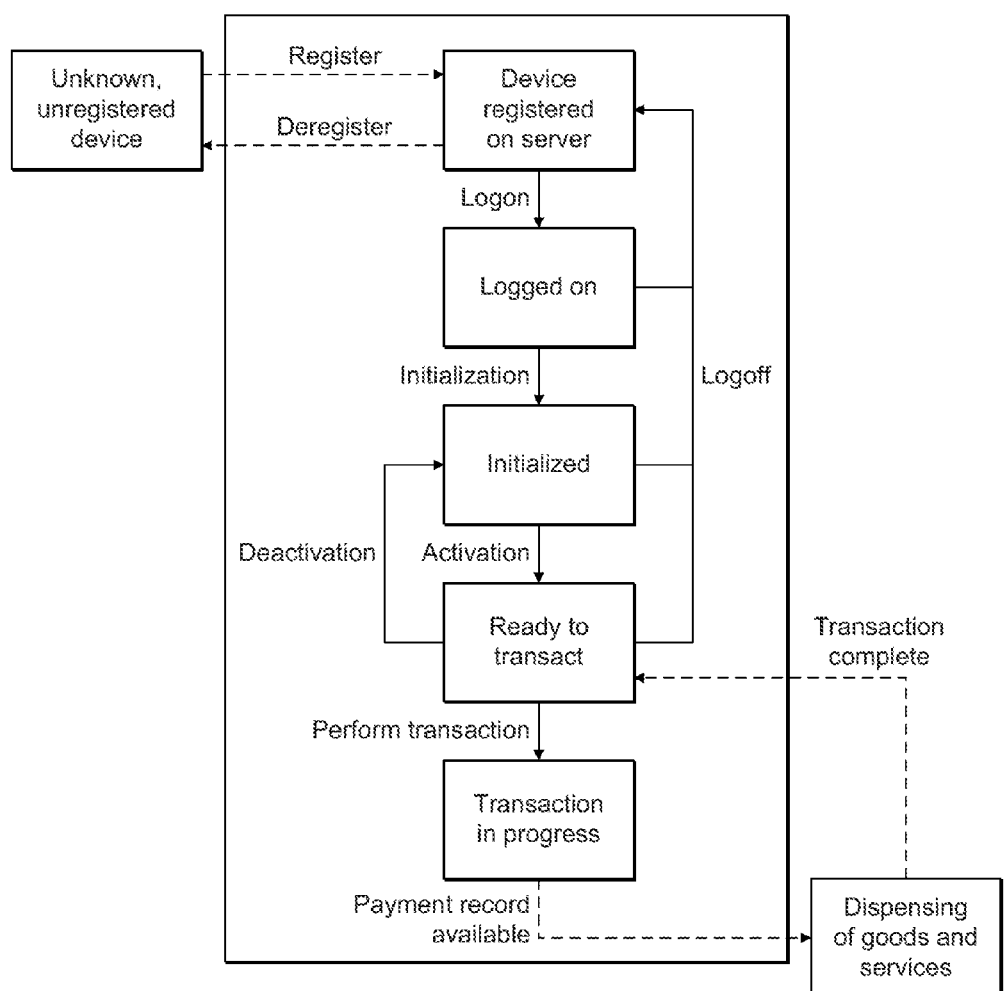
FIG. 3 shows operations when a purchase using IC-MPOS is made.

In FIG. 3, solid lines indicate parts that are specifically addressed by the present document. Dotted lines indicate parts that are not specifically addressed by the present document.

2. Architecture

2.1 Introduction

This section describes both the physical and the logical architecture of the MPOS System according to embodiments.

2.2 Physical Architecture

Figure 4:
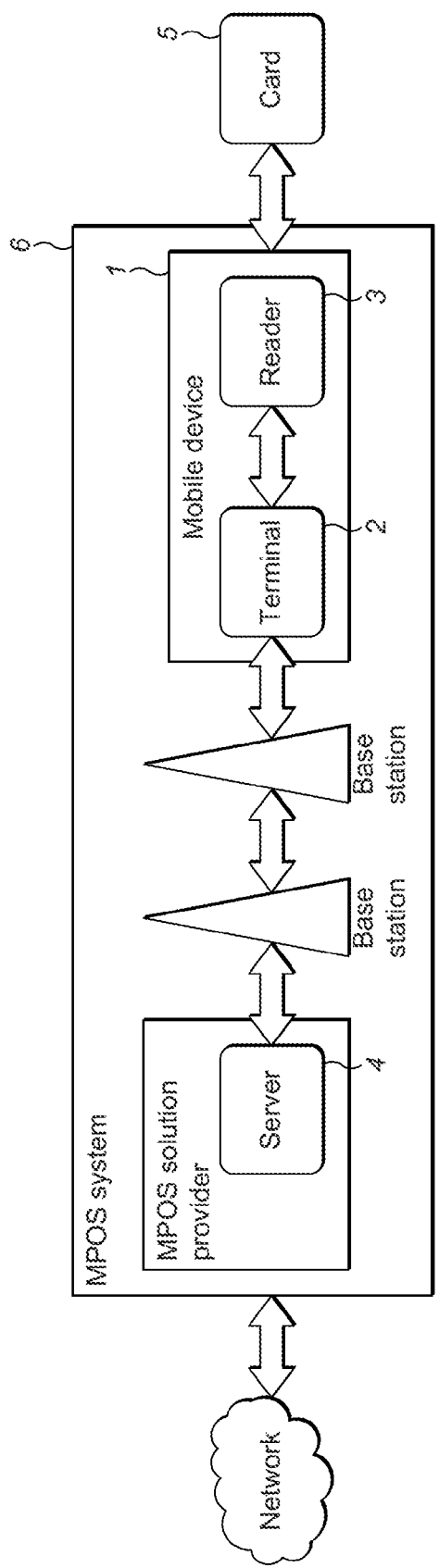
FIG. 4 shows the components of an embodiment of an IC-MPOS system in accordance with an aspect of the present invention.

The physical architecture of a IC-MPOS System consists of a Server 4 connected to a mobile device 1 through a (wireless) telecommunication network as shown in FIG. 4.

The Server 4 is typically located at the MPOS Solution Provider but may alternatively be located at any other entity, such as the Payment Facilitator. The mobile device 1 is located at the Merchant. The architecture is independent of the type of communication used between the Server 4 and the mobile device 1.

2.3 Logical Architecture

Figure 5:
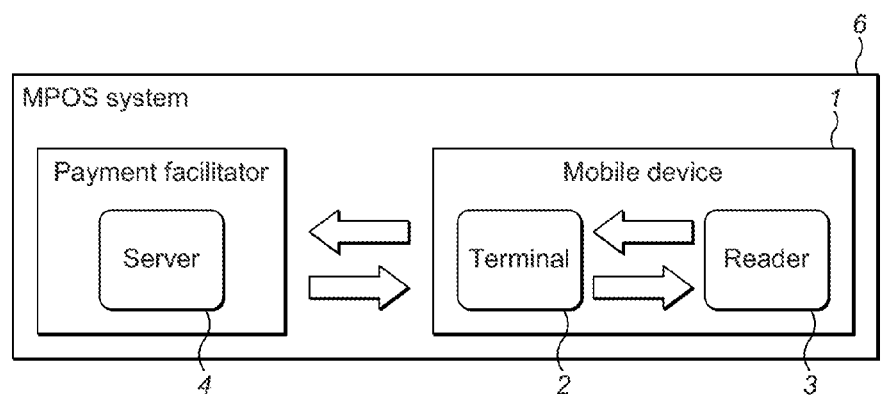
FIG. 5 shows the logical architecture of an embodiment of an IC-MPOS system in accordance with an aspect of the present invention.
Figure 6:
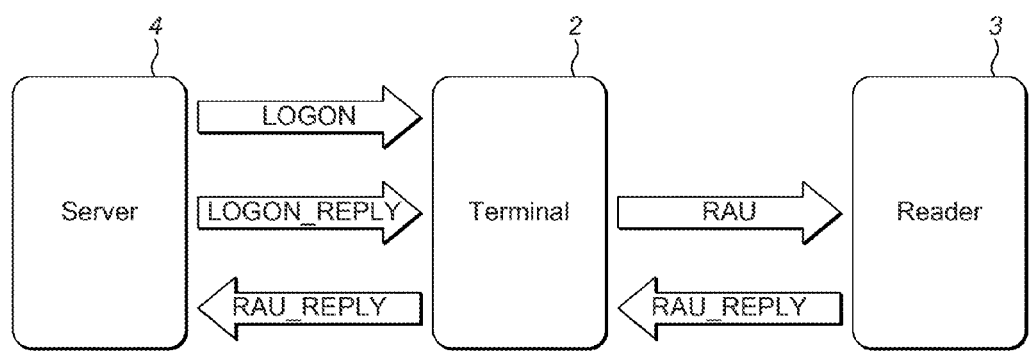
FIG. 6 shows communication paths during a logon operation in an embodiment of an IC-MPOS system in accordance with an aspect of the present invention.
Figure 7:
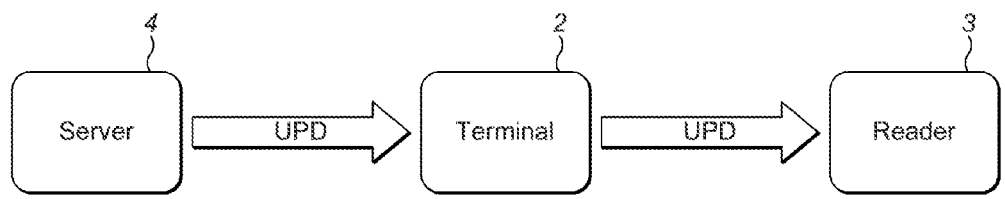
FIG. 7 shows communication paths during an initialization operation in an embodiment of an IC-MPOS system in accordance with an aspect of the present invention.
Figure 8:
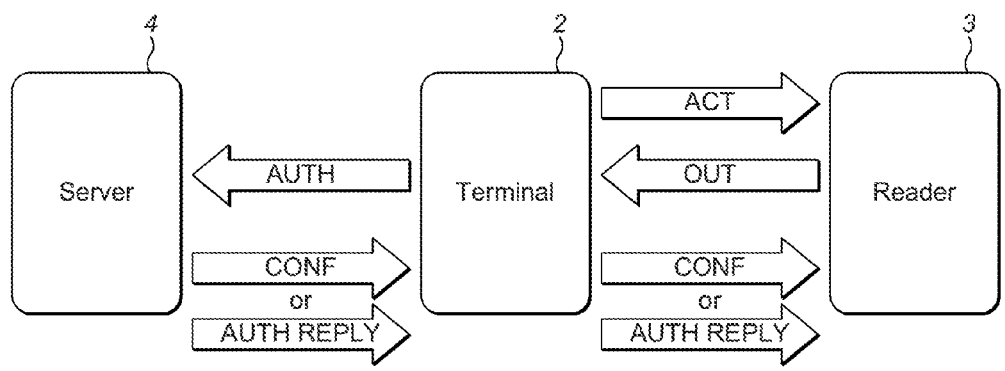
FIG. 8 shows communication paths during an offline to issuer payment transaction operation in an embodiment of an IC-MPOS system in accordance with an aspect of the present invention.
Figure 9:
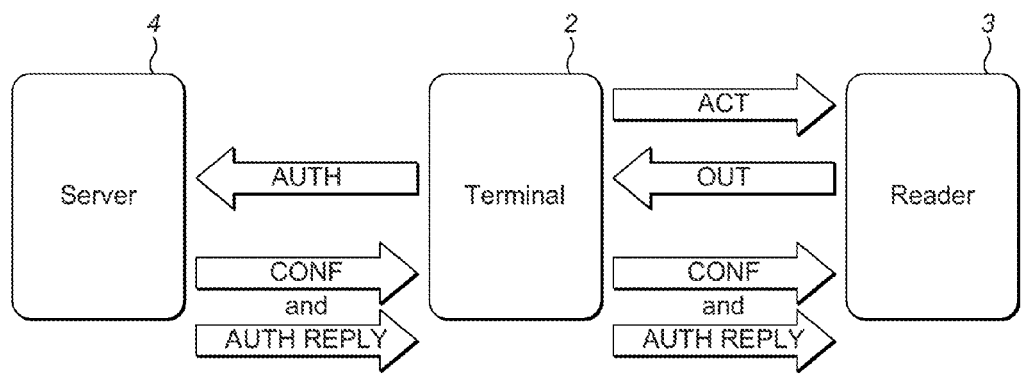
FIG. 9 shows communication paths during online to issuer payment transaction operation in an embodiment of an IC-MPOS system in accordance with an aspect of the present invention.
Figure 10:
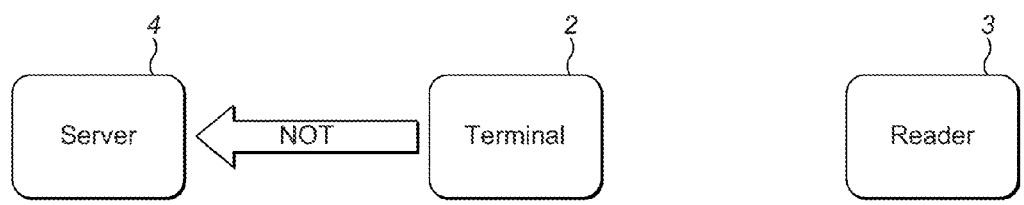
FIG. 10 shows communication paths during a Terminal service request operation in an embodiment of an IC-MPOS system in accordance with an aspect of the present invention.
Figure 11:
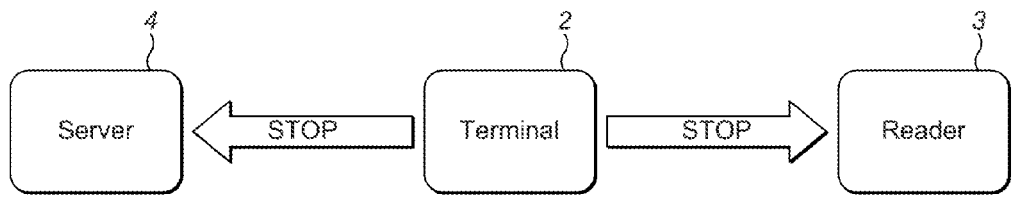
FIG. 11 shows communication paths during a logout operation initiated by a Terminal in an embodiment of an IC-MPOS system in accordance with an aspect of the present invention.
Figure 12:
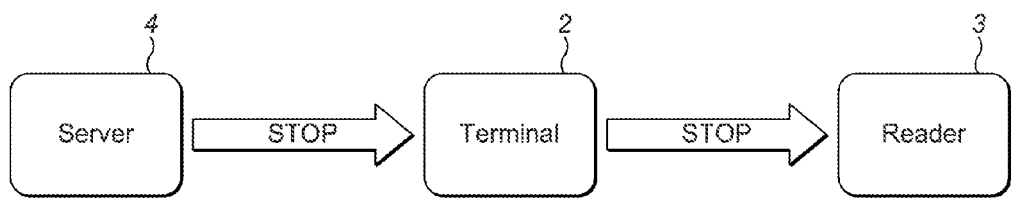
FIG. 12 shows communication paths during a logout operation initiated by a Server in an embodiment of an IC-MPOS system in accordance with an aspect of the present invention.
Figure 13:
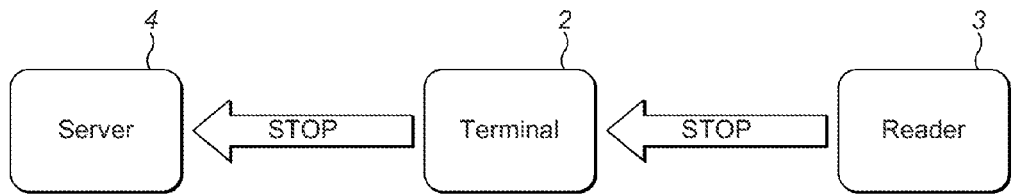
FIG. 13 shows communication paths during a logout operation initiated by a Reader in an embodiment of an IC-MPOS system in accordance with an aspect of the present invention.

The logical architecture of the MPOS System has three entities: Server 4, Terminal 2 and Reader 3 and is illustrated in FIG. 5.

The dialogue between Terminal 2 and Reader 3 and between Server 4 and Terminal 2 is modelled as service requests, with Signals being used as vehicle for communicating these requests.

Depending on the Signal, the response Signal either returns data, is a simple acknowledgement or is absent.

The partitioning as laid out in the present document is not intended to be prescriptive and there is no requirement to create mobile devices that use this architecture. Alternative logical partitioning that fulfils the requirements is acceptable.

In a preferred embodiment, the mobile device 1 has a secure element, or similar trustworthy execution zone, and the Reader 3 functionality (with the exception of Process P as described later), is implemented in this secure element. There is therefore an architectural split between Terminal 2 and Reader 3 in the preferred type of design according to embodiments.

3. Signals

3.1 Introduction

This section describes the Signals exchanged between Reader 3, Terminal 2 and Server 4 for the purpose of logon, initialization, transaction processing and logout according to embodiments. The coding of the Signals is not intended to be prescriptive. Additional information on Signals is presented in the following sections of the present document.

3.2 General

3.2.1 Signal Name

Different Signal names are used to distinguish between actions requested and to distinguish a request from a response.

The different Signal names are (in alphabetical order): ACT, AUTH, AUTH_REPLY, CONFIRM, LOGON, LOGON_REPLY, NOTIFY, OUT, STOP, RDR_AUTH, RDR_AUTH_REPLY and UPDATE.

3.2.2 Layout

The generic format of a Signal is illustrated in Table 4. A Signal comprises a name, a variable and optionally one or two TLV data items, one plaintext and one ciphertext.

TABLE 4

| | | Payload | | | | | |
|---|---|---|---|---|---|---|---|
| Signal Name | Starting Variable | Identifier cleartext data | Length of data | Cleartext data | Identifier ciphertext | Length of Ciphertext | Ciphertext |
| MsgID | S RMC SMC | $ID_A$ | $L_A$ | A | $ID_C$ | $L_C$ | C |

The meaning of the different data objects in a Signal is explained in Table 5.

TABLE 5

| Object | Pres. | Meaning | Comment | |
|---|---|---|---|---|
| MsgID | | M | Message Identifier | Each Signal name (ACT, AUTH, AUTH_REPLY, CONFIRM, LOGON, LOGON_REPLY, NOTIFY, OUT, STOP, RDR_AUTH, RDR_AUTH_REPLY, UPDATE) is assigned a unique value. |
| RMC | S | M | Reader Message Counter | For signals from the Reader, the value is set by the Reader and is incremented for each Signal sent. For Signals from the Server, if the Signal is a response to a Signal from the Reader, it is the same value as the Reader Message Counter value of the request. If the Signal is not in response to a Reader request it is the last value seen from the Reader. | The concatenation of the 5 byte RMC and 6 byte SMC combination is used a 11 byte nonce (or Starting Variable) S for checking replays and for cryptographic processing. |
| SMC | | | Server Message Counter | For signals from the Server, the value is set by the Server and is incremented for each Signal sent. For Signals from the Reader, if the Signal is a response to a Signal from the Server, it is the same value as the Server Message Counter value of the request. If the Signal is not in response to a Server request it is the last value seen from the Server. | |
| $ID_A$ | | O | Identifier of cleartext data | If present, one of the following values<br>'FF8110'  Template including unauthenticated data for the Terminal<br>'FF8111'  Template including authenticated data for the Terminal<br>'FF8130'  Template including unauthenticated Terminal data for the Server<br>'FF8131'  Template including authenticated Terminal data for the Server |
| $L_A$ | | | Length of cleartext data | Length of Cleartext data |
| A | | | Cleartext data | Plain text data that may be authenticated. If authenticated, then authentication is performed according to Section 11. |
| $ID_C$ | | O | Identifier of ciphertext data | If present, one of the following values<br>'DF8122'  Primitive Data Object tag indicating authenticated and encrypted Server data for the Reader.<br>'DF8132'  Primitive Data Object tag indicating authenticated and encrypted Reader data for the Server. |
| $L_C$ | | | Length of ciphertext data | Length of Ciphertext |
| C | | | Ciphertext | Data (a list of TLV data items prior to encryption) encrypted and authenticated according to Section 11. Once decrypted and validated, the result is a list of TLV data items. |

Sending a Signal

If the Reader 3 sends a Signal containing primitive data object DF8132' then the Reader 3 will
  Protect the data as indicated in Sections 5 and 11
  Increment RMC by 1 after sending the Signal.

If the Server 4 sends a Signal containing primitive data object 'DF8122' then the Server 4 will
  Protect the data as indicated in Sections 5 and 11
  Increment SMC by 1 after sending the Signal.

Certain rules apply to the templates in regard of cryptographic protection:

A signal with a template 'FF8111' must also contain a primitive data object 'DF8122'.

A signal with a template 'FF8131' must also contain a primitive data object 'DF8132'.

Whilst in principle the Terminal 2 could generate a template 'FF8131' and pass it to the Reader 3 for protection, the use of this template in a preferred embodiment is for the Reader 3 to pass data in clear that the Terminal 2 can interpret whilst still authenticating it to the Server 4.

Receiving a Signal

If the Signal received contains a primitive data object 'DF8132' then the Server 4 will perform the following checks:

If RMC received is not greater than the Server's version ($RMC_{Serv}$), it will not process the Signal and send a STOP('Logout') Signal.

It will validate the cryptography of the Signal (see Sections 5 and 11). If incorrect it will not process the Signal further and will send a STOP('Logout') Signal If RMC and the cryptography are correct, the Server 4 will set $RMC_{Serv}$ equal to the value of the received RMC.

If the Signal received contains a primitive data object 'DF8122' then the Reader 3 will perform the following checks:

If SMC received is not greater than the Reader's version ($SMC_{Read}$), it will not process the Signal and send a STOP('Logout') Signal.

It will validate the cryptography of the Signal (see Sections 5 and 11). If incorrect, it will not process the Signal further but Erase all data labelled 'T'; sensitive data, such as keys are securely erased by overwriting them with random data.

and send a STOP('Logout') Signal;

If SMC and the cryptography are correct, the Reader 3 will set $SMC_{Read}$ equal to the value of the received SMC.

If a Signal only contains a template 'FF8110' or a template 'FF8130' then RMC and SMC are neither checked nor manipulated and RMC and SMC can have any value.

A Signal that contains Template 'FF8131' must also contain Primitive data object 'DF8132' and similarly a signal with a template 'FF8111' must also contain a primitive data object 'DF8122'. If this rule is not followed, it is treated as a cryptographic verification failure.

4. Processes 4.1 Introduction

As specified in [READER], functionality is allocated to processes and different processes will be active depending on the phase; the phases being logon, initialization, transaction processing and logoff.

When changing phase, one process may wake up another process and go dormant itself.

Figure 14:
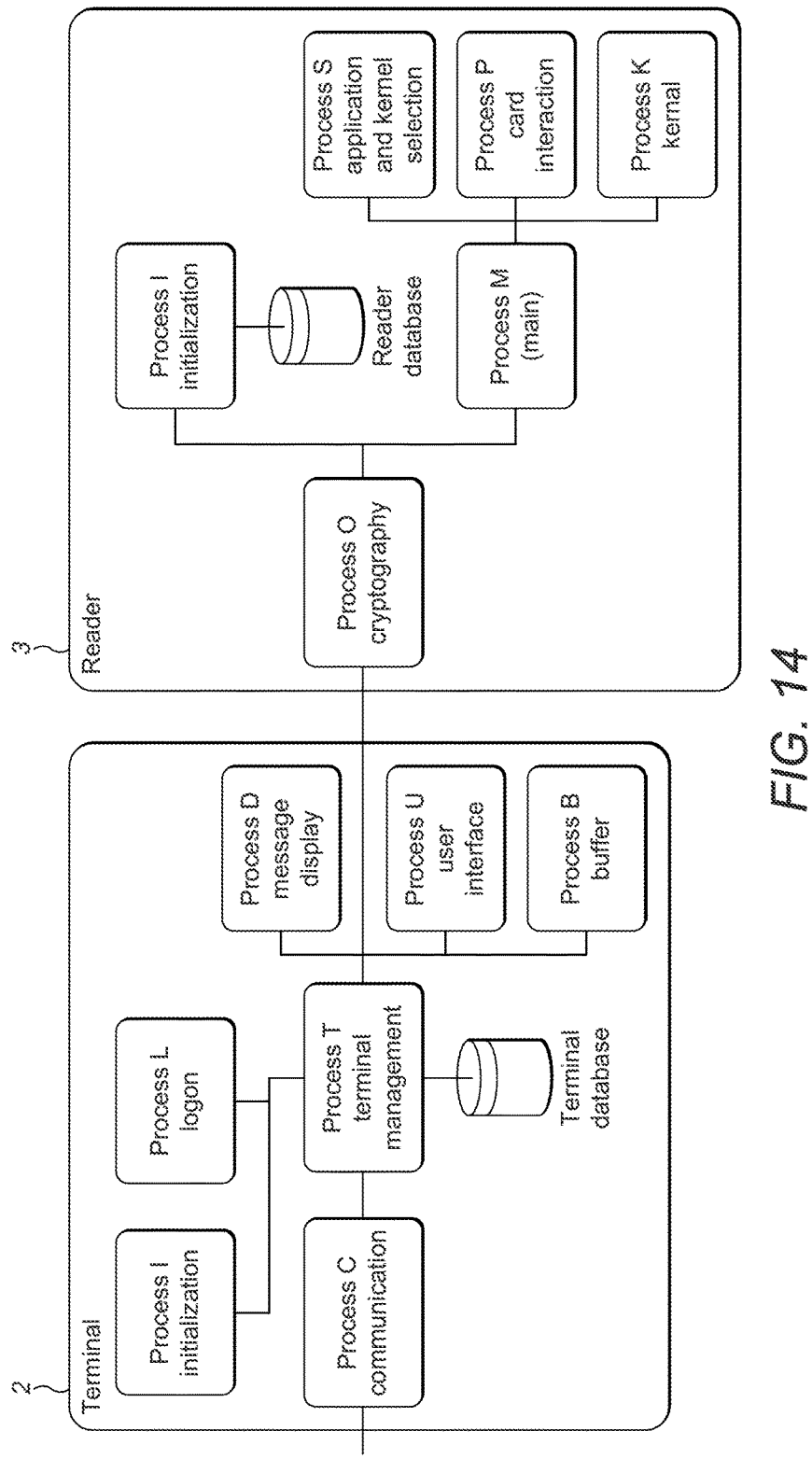
FIG. 14 shows the functionality of the Terminal and Reader in an embodiment.

FIG. 14 zooms in on the Terminal 2 and Reader 3 functionality for the different phases. It shows how the Terminal 2 and Reader 3 functionality is allocated to different processes.

The Terminal 2 includes the following processes: Process T(erminal management), Process I(nitialization), Process L(ogon), Process U(ser Interface), Process D(isplay), Process B(uffer) and Process C(ommunication).

The Reader 3 includes the following processes: Process M(ain), Process I(nitialization), Process S(elect), Process P(CD), Process K(ernel) and Process O (CryptOgraphy).

As per [READER], the Kernel has two components: the Kernel software, modelled as a state machine, and the Kernel database, consisting of a number of separate datasets.

Figure 15:
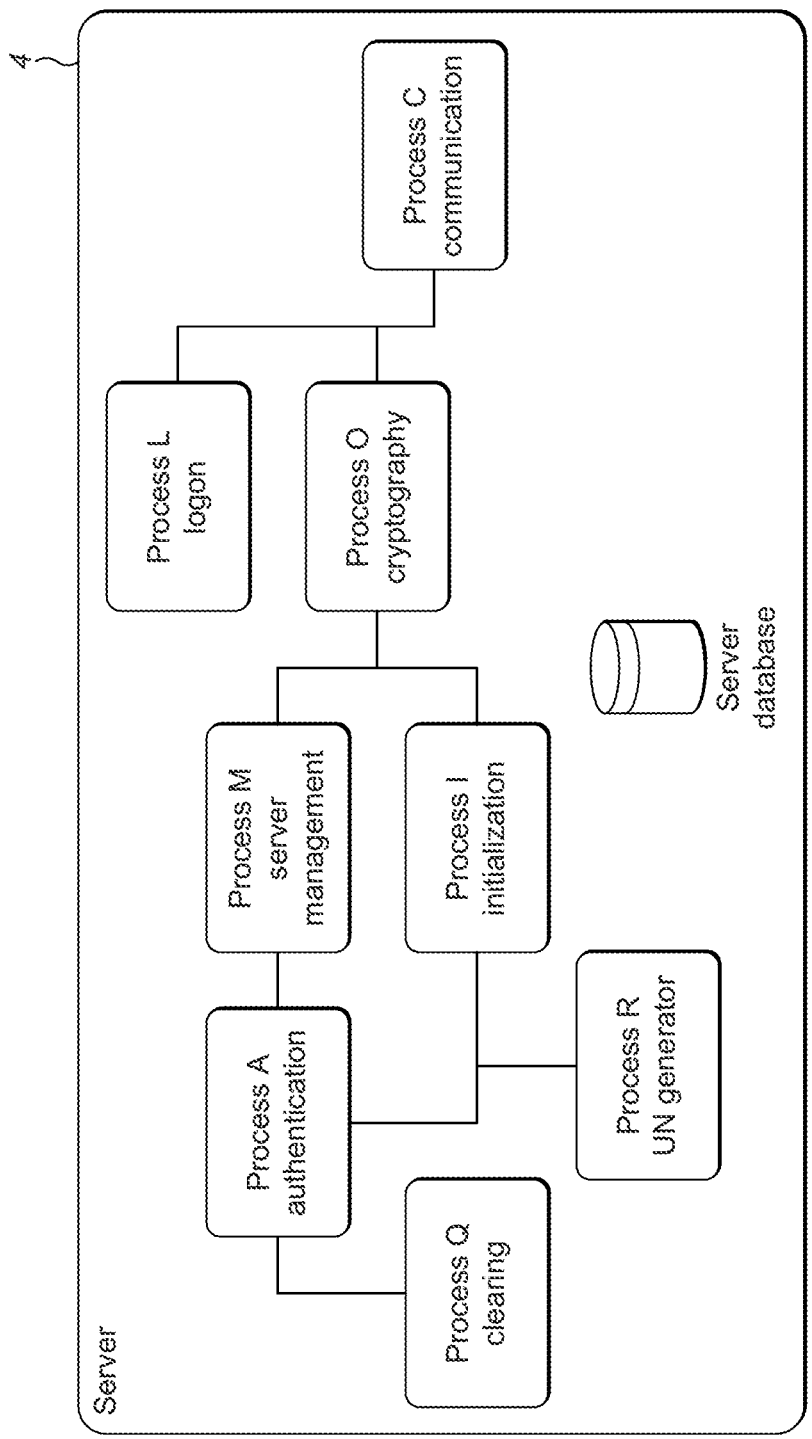
FIG. 15 shows the functionality of the Server of FIG. 12 according to an embodiment.

FIG. 15 illustrates the Server 4 functionality and its different processes: Process M (Server Management), Process A(Card Authentication and authorization), Process R(andom Number Generation), Process I(nitialization), Process L(ogon), Process C(ommunication), Process O (CryptOgraphy), Process Q (Transaction Clearing).

The following functionality is not addressed by the present documents:

e-receipt where the Terminal 2 provides a receipt to the customer through electronic means, such as e-mail or SMS.

service provisioning and goods dispensing

5. Security Architecture 5.1 Introduction

Different from known fixed terminal POS devices, the mobile device 1 is far more open to malware and unauthorized software modifications.

Attacks may be performed during each phase: logon, initialization, transaction processing and logout as has already been explained.

5.2 Countermeasures

Section 5.1 has introduced the broad categories of vulnerabilities that need to be addressed by security countermeasures. Countermeasures defined by this security architecture include:

Data protection to support login and authenticate the Server 4 to the Merchant

A strong log-in process to identify the Merchant, Clerk and mobile device 1 to Server 4.

Authentication of Terminal 2 and Reader 3 as part of the initialization process and transaction processing.

Data protection through encryption of the sensitive transaction data between Reader 3 and Server 4 plus sanitization of transaction data exchanged between Reader 3 and Terminal 2

Card data authentication based on

The generation of and consistency check on the Unpredictable Number (UN)

Figure 16:
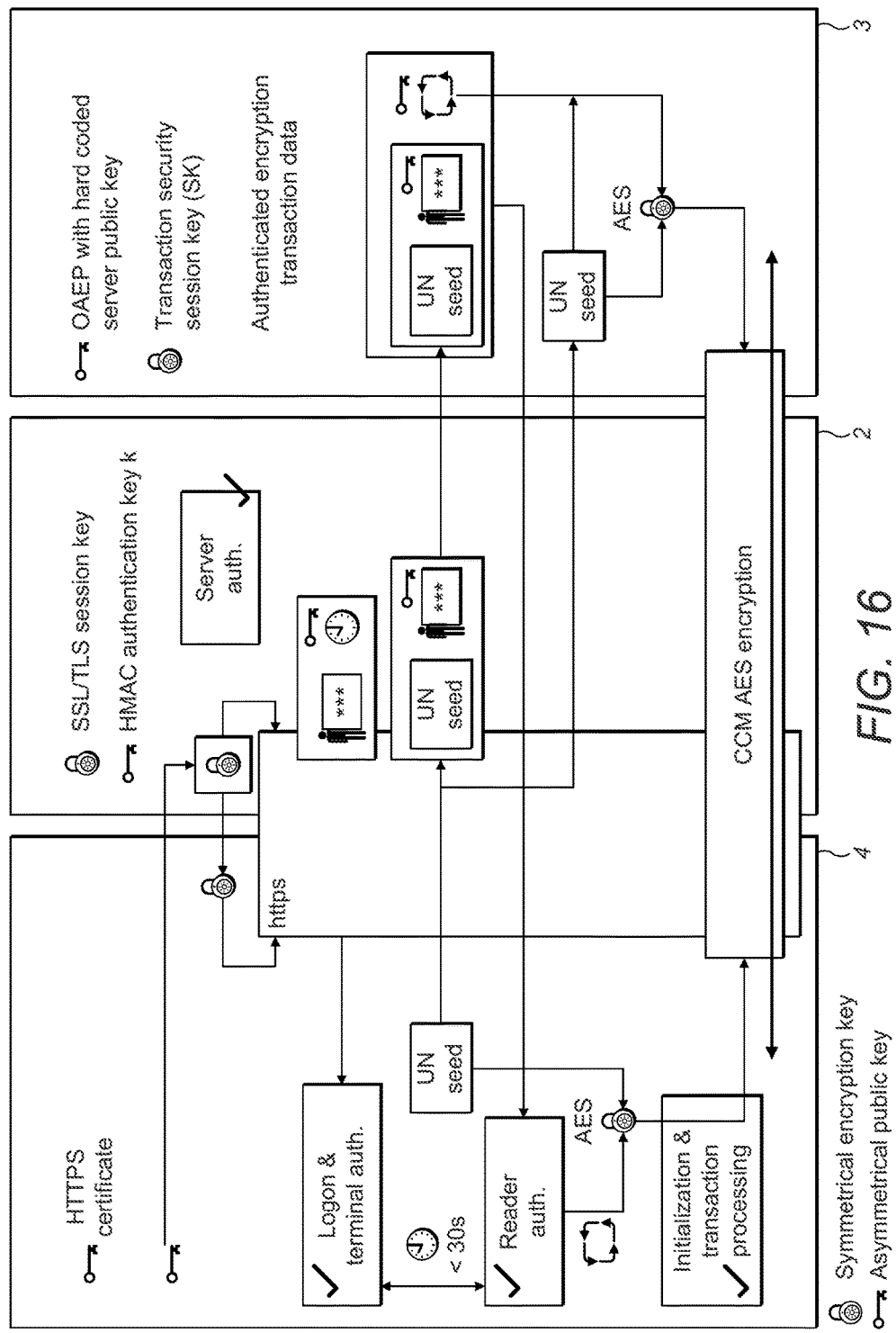
FIG. 16 shows security features of an embodiment of an IC-MPOS system in accordance with an aspect of the present invention.

(double) checking CDA in the Server 4 if m-PIN is used or if transactions are authorized offline The combination of the different countermeasures is illustrated in FIG. 16.

Prior to sending logon data, Terminal 2 and Server 4 set up an HTTPS session and the Terminal 2 verifies the Common Name (CN) of the Server 4 matches its expected value in order to authenticate the Server 4. Logon is based on a password (PWD, represented in FIG. 16 as ****) specific to a Clerk which is combined with (shared secret HMAC) Terminal 2 authentication data to generate a first, time-based token (T1). This step is referred to as Terminal authentication.

Upon successful Terminal authentication, the Server 4 generates a seed for the generation of unpredictable numbers ($Seed_{UN}$). The Server 4 sends this seed to the Terminal 2, which then forwards it to the Reader 3 as part of its initialization data. This seed is also used in the Reader 3 authentication stage as described below.

The system relies on the Server 4 to police the generation of Unpredictable Numbers—while being resilient to network outages. Every UN generated by the Reader 3 is (as far as the Server 4 is concerned) deterministic and can be reproduced by the Server 4 provided it knows the sequence of transactions. It cannot however predict the future sequence.

Reader authentication is based the same mechanism as is used for the Terminal 2 authentication but using $Seed_{UN}$ as a challenge to produce a second token (T2). $Seed_{UN}$ is also combined with random data to form session keys. The combination of the random data and the token is sent encrypted to the Server 4 (using public key cryptography, PubK2).

In Reader 3 and Server 4, separate session keys are derived for data sent from the Server 4 (SK2) and from the Reader 3 (SK3). The same authenticated encryption methods are used for both.

The Server 4 will initialize the Terminal 2 and Reader 3 using Signals protected by authenticated encryption.

All data sent from the Server 4 during the initialization phase is protected for integrity and authenticity using a session key (SK2) shared between Server 4 and Reader 3; data that is exchanged between the Server 4 and the Reader 3 may also be encrypted using SSL/TLS.

Figure 17:
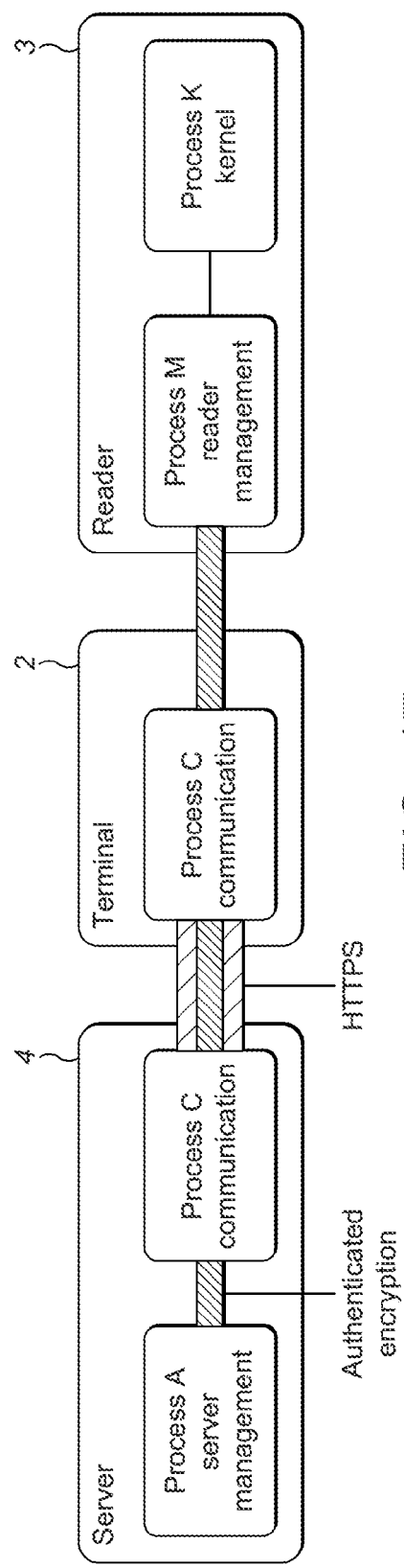
FIG. 17 shows data protection in an embodiment of an IC-MPOS system in accordance with an aspect of the present invention.

The combination of authenticated encryption between Server 4 and Reader 3 and the HTTPS session between Server 4 and Terminal 2 is illustrated in FIG. 17.

Terminal 2 initialization data coming from the Server 4 is processed as follows:
  The Terminal 2 takes a copy of the Terminal 2 initialization data and forwards all the data to the Reader 3.
  The Reader 3 will check the integrity of all the data (using SK2) and report errors back to the Terminal 2.
  If an error is reported, the initialization process stops.
  After initialization, Terminal 2 and Reader 3 are ready for transaction processing.

Every purchase transaction includes the generation of an unpredictable number (UN). For a purchase transaction, the Reader 3 must always perform Combined Data Authentication (CDA) if possible as it cannot know before the transaction is completed whether it will have network communications or not.

Transaction data sent by the Reader 3 to the Server 4 is protected through authenticated encryption (using SK3). Transaction data sent by the Reader 3 to the Terminal 2 (including the transaction outcome) is sanitized so that sensitive information is removed.

Reader Process M will sanitize the data by redacting the plaintext Data Record and Discretionary Data received from Process K and generate two new data items for the Terminal 2: Sanitized Data Record and Sanitized Discretionary Data. The Sanitized Data Record includes the redacted PAN. This provides the Terminal 2 with details of the results of the transaction without sharing the complete PAN. The full Data Record and Discretionary Data will be encrypted and authenticated by Process O before being passed to the Terminal 2 as the Protected Transaction Data.

To allow the Server 4 to check whether CDA was performed correctly (in other words with the right CA keys), the Outcome provided by the Reader 3 must contain everything that it needs to repeat the CDA calculation with the exception of the Payment System Public Key.

The Terminal 2 must always send to the Server 4 every transaction performed, in sequence, to maintain Unpredictable Number synchronization. This includes transaction that were declined or performed successfully during in the (temporary) absence of network connectivity as well as transactions that failed where an Application Cryptogram or a response to Compute Cryptographic Checksum was not obtained.

The Server 4 will check that the UN, sent by the Terminal 2 as part of the transaction data, matches its own calculation using the daily UN seed and its registered identifier. The Server 4 will only authorize offline or forward on a transaction online for authorization where the UN is as expected.

The card will have signed the same UN in its Application Cryptogram (AC) or dynamic CVC3 (dCVC3) calculation and the Issuer will verify in AC or dCVC3 checking that the UN was the same as supplied to the card. This mechanism provides a strong countermeasure to many forms of attack.

The Server 4 must perform CDA for transaction that use m-PIN and for transactions that are authorized offline and may perform CDA otherwise.

If CDA fails, the Server 4 must reject the transaction and inform the Terminal 2, which will in turn inform the Reader 3.

The remainder of this section describes some of the different steps into more detail.

5.3 Data Protection to Support Logon and Initialization

Prior to the login, data protection is put in place through HTTPS using SSL/TLS.

The Terminal 2 has been provisioned with a CA root key to verify the Server SSL Certificate and with the CN of the MPOS Solution Provider in order to verify that the correct Server 4 is communicating with it.

The Terminal 2 extracts the public key (PubK1) of the Server 4 from the SSL Certificate and encrypts a session key SK1 with the public key. The encrypted session key is sent to the Server 4.

At the end of this process, both Server 4 and Terminal 2 share session key SK1, that will be used to encrypt all further communication (SSL/TLS).

5.4 Logon and Terminal Authentication

Logon is performed using a token which functions as a One Time Password (OTP) combining Terminal 2 data, Terminal 2 secrets and a Clerk entered static password together with date and time.

The Terminal 2 logs on to the Server 4 by sending MerchantID, ClerkID, TerminalID, DateTime and $T1_{TRUNC}$, a 4-byte truncated form of Token T1.

The token calculation is illustrated in Section 10.1.

For the token calculation, string s is formed from the Clerk Password, the Merchant ID, the Terminal ID, the Clerk ID and date and time (this is HOTP as defined in IETF RFC4226 but without the decimalisation stage and using Date & Time instead of a counter).

$s_{Term} = PWD_{Term} \| MerchantID_{Term} \| ClerkID_{Term} \| TerminalID_{Term} \| LogOnDateTime_{Term}$ Token $T1_{Term}$ is an HMAC with SHA-256 as defined in [ISO/IEC 9797-2] as MAC Algorithm 2, calculated using the authentication key $k_{Term}$ over string $s_{Term}$ $T1_{Term} = HMAC(k_{Term}, s_{Term})$ Further details can be found in Section 10.1

The Server 4 validates Token T1 using its own version of the Clerk's password ($PWD_{Serv}$) corresponding to the tuple (Merchant ID, Clerk ID). The date and time of any attempted logon must be later than the stored date and time of the last successful logon ($LogOnDateTime > DateTime_{LastLogon}$) of the tuple (Merchant ID, Clerk ID) and within an acceptable time window ($|LogOnDateTime - LogonAttemptDateTime_{Serv}| <$ for example 30 seconds). Upon successful validation, the Server 4 updates $DateTime_{LastLogon}$ for the tuple (Merchant ID, Clerk ID) with the value of $LogOnAttemptDateTime_{Serv}$ (to ensure that the token cannot be reused) and returns the 16 byte random seed for the UN generation ($Seed_{UN}$) to the Terminal 2.

Result

At the end of this process,
  1. Clerk, Merchant and Terminal are authenticated to the Server 4
  2. $DateTime_{LastLogon}$ is updated with LogOnAttemptDateTime (and the value of $LogOnAttemptDateTime_{Serv}$ can be discarded)
  3. The Server 4 has sent a seed for the UN generation to the Terminal 2, with the intention that the Terminal 2 passes the seed to the Reader 3.

5.5 Reader Authentication

Reader 3 authentication establishes a set of shared keys between Reader 3 and Server 4 and demonstrates to the Server 4 that the shared key for transaction authentication and confidentiality is correctly held by Reader 3 associated with the authenticated tuple of Merchant, Terminal and Clerk.

Authentication starts with a challenge from the Server 4 ($Seed_{UN}$) which is incorporated into a token similar to the one used for Logon. This token combines Terminal data, Terminal secrets and a Clerk entered static password together with the challenge $Seed_{UN}$.

The token calculation is illustrated in Section 10.1.

For the calculation of Token T2, string s is formed from the Clerk Password, the Merchant ID, the Clerk ID, the Terminal ID and $Seed_{UN}$ (this is HOTP as defined in IETF RFC4226 but without the decimalisation stage and using $Seed_{UN}$ as a challenge).

$s = PWD_{Term} \| MerchantID_{Term} \| ClerkID_{Term} \| TerminalID_{Term} \| Seed_{UN}$.

and $T2 = HMAC(k_{Term}, s)$.

The Terminal 2 sends $T2_{TRUNC}$, the 4 bytes truncated form of T2, together with $Seed_{UN,Read}$ to the Reader 3.

The Reader 3:
- Creates a random number R. R is long enough that when concatenated with $T2_{TRUNC}$ it is the longest message that may be enciphered with PubK2 as described below given the length of the key PubK2.
- Calculates two session keys SK2 and SK3 using AES in ECB mode using the first 128 bits of R (R1) as the key for SK2 and the last 128 bits of R (R2) as the key for SK3 using in both cases $Seed_{UN}$ as the data to be enciphered.

$SK2_{Read} = AES(R1)[Seed_{UN}]$
  $SK3_{Read} = AES(R2)[Seed_{UN}]$

- Calculates a pre-image P by hashing the reader's identifier ($MMI_{Read}$) and seed for the UN generation ($Seed_{UN}$) received from the Terminal 2.

$P_{Read,0} = SHA-256(Seed_{UN} \| MMI_{Read})$

- Calculates its first unpredictable number $UN_{Read,1}$, by hashing pre-image $P_{Read,0}$.

$UN_{READ,1} = SHA-256(P_{Read,0})$

- The Reader 3 and installs both pre-image $P_{Read,0}$ and unpredictable number $UN_{READ,1}$ in the Reader 3 database.
- Concatenates R with $T2_{TRUNC}$ ($R \| T2_{TRUNC}$) and encrypts the concatenation $R \| T2_{TRUNC}$ with the hard coded (In order to change the asymmetric key, the Reader 3 application in the mobile handset will be updated, but this will be a rare event) public key of the Server 4 (PubK2) that the Reader 3 has been provisioned with. The method of encryption used is RSA OAEP as defined in [ISO/IEC 18033-2] as RSAES. The Hash function to be used is SHA-256 and the KDF is KDF1. Additional information is available in Section 10.3.
- Initializes its Reader Message Counter ($RMC_{Read}$) to one
- Initializes its copy of the Server Message Counter ($SMC_{Read}$) to zero
- Erases $Seed_{UN}$, R, R1 and R2.

The Reader 3 sends the result of the encryption to the Terminal 2, for delivery to the Server 4.

This is the trigger for the Terminal 2 to erase its copy of $PWD_{Term}$.

The Server 4
- decrypts and validates the message using its private key PrivK2.
- validates $T2_{TRUNC}$ by calculating T2 using its copy of the data.
- retrieves R from the decrypted message and derives $SK2_{Serv}$ and $SK3_{Serv}$ using its local version of $Seed_{UN,Serv}$.
- calculates a pre-image $R_{Serv,0}$ by hashing its local version of the reader's identifier ($MMI_{Serv}$) and the seed for the UN generation ($Seed_{UN,Serv}$) $P_{Serv,0} = SHA-256(Seed_{UN,Serv} \| MMI_{Serv})$
- initializes the Server Message Counter ($SMC_{Serv}$) to one
- initializes its copy of the Reader Message Counter ($RMC_{Serv}$) to zero.

The session key SK2 established between Server 4 and Reader 3 is then used for authentication and encryption of signals from Server 4 to Reader 3 including the management of Terminal 2 and Reader 3 data during the initialization phase. The session key SK3 established between Server 4 and Reader 3 is used with an authenticated encryption system to protect signals from the Reader 3, specifically the passing of transaction data to the Server 4.

Result

At the end of this process,
1. A session key SK2 is established between Server 4 and Reader 3. This session key can be used to protect the initialization data or Terminal 2 and Reader 3.
2. The Reader 3 and the session key SK3 have been authenticated and the Reader 3 has been initialised with a first unpredictable number UN and a pre-image P for further UN generation.
3. Server 4 and Reader 3 have initialized their respective versions of Pre-image P, Reader Message Counter and Server Message Counter.
4. The Reader 3 has its first UN available.
5. Sensitive data used for the calculation of the session keys SK2 and SK3 are erased from the Reader 3 and the Terminal 2 (including the temporary copy of $PWD_{Term}$).
6. Terminal 2 and Reader 3 are now ready for further initialization.

5.6 Initialization of Reader & Terminal Data

To protect the data the method shown in Section 11 will be used with the following parameters:

The Initialisation data to the Terminal 2 will be used for A and be sent in template 'FF8111'.

The Initialisation data to the Reader 3 will be used for D and be sent in primitive data object 'DF8122'

The algorithm used is AES with 128 bit keys using SK2.

The concatenation of $RMC_{Serv} \| SMC_{Serv}$ is used for S.

The Server 4 increments $SMC_{Serv}$ by 1 after sending the Signal.

The Reader 3 will check that SMC received is greater than the counter of the last received correct message (i.e. $SMC_{Read}$). The Reader 3 will update its copy of the counter with the value contained in a correctly processed message.

In the event that the Reader 3 needs to indicate an error to the Terminal 2 and the Server 4:

Data to the Terminal 2 will be used for A and be sent in template 'FF8131'.

Data to the Server 4 will be used for D and be sent in primitive data object 'DF8132'

The algorithm used is AES with 128 bit keys using SK2.

The concatenation of $RMC_{Read} \| SMC_{Read}$ is used for S.

The Reader 3 increments $RMC_{Read}$ by 1 after sending the Signal.

The Server 4 will check that RMC received is greater than the counter of the last received correct message (i.e. $RMC_{Serv}$). The Server 4 will update its copy of the counter with the value contained in a correctly processed message.

When the Server 4 sends updates to the Terminal 2 it uses the concatenation of $RMC_{Serv}\|SMC_{Serv}$ as nonce S and key $SK2_{Serv}$ to protect them. As $SMC_{Serv}$ is incremented after use, nonce S is updated as well and two messages are never generated with the same combination of key and counter.

The message to be protected will comprise TLV data for the Terminal 2 in template 'FF8111' and for the Reader 3 in primitive data object 'DF8122'. The data in template 'FF8111' will be processed as authenticated but unencrypted data A and the data in 'DF8122' will be processed as encrypted data D. The result of decryption will be a flag indicating the correctness of the data and a list of TLV data items for the Reader 3.

When an update message is received from the Server 4, the Terminal 2 will apply updates as per template 'FF8111' and will pass the complete message to the Reader 3. The Reader 3 will validate the message and apply any updates in 'DF8122'. If the validation fails, it will indicate error to the Terminal 2 and the initialization process will stop. Validation fails if:

SMC received is not greater than the Reader's version ($SMC_{Read}$).

the cryptographic processing fails.

If validation succeeds, $SMC_{Read}$ is set to the value of SMC that was received.

The IC-MPOS may be used for transactions when the data item Operational Status is present in the Terminal 2 database with the most significant bit in the first byte set. The Server 4 would use an update to this data item to enable or disable the transaction processing availability of the IC-MPOS. Other bits in this data item are RFU.

Enabling transaction processing activates a number of (dormant) process in the Reader 3. Prior to awakening these process, the Reader 3 will perform the following consistency checks:

For each RID, a set of Payment System Public Keys and a signature over this set of keys must be present.

The Reader 3 checks this signature to verify the correctness of the CA keys installed using a public key (PubK3) hardcoded in the Reader 3 for this purpose.

If data are absent or the signature verification fails, then the Reader 3 reports an error back to the Terminal 2 (through a STOP("Logout") Signal) and leaves the transaction related processes dormant.

Result

Conditional to all the messages being validated as authentic together with whichever counters were used in protected messages being incremented, the Terminal 2 and Reader 3 will be initialized and ready to perform a first transaction.

5.7 Data Protection During Transaction Processing

Data protection includes:

Transaction data sanization through redaction of Data Record (tag 'FF8105') and Discretionary Data ('FF8106') that are sent to the Terminal 2.

Integrity and confidentiality of sensitive transaction data through authentication and encryption of data sent to the Server 4.

Transaction Data Sanitization

The Reader 3 (Process M) will take a copy of the Data Record and Discretionary Data generated by the Kernel (Process K) and redact this copy before sending them to the Terminal 2.

The redaction of the copy of the Data Record will be performed as described in Table 41 and results in the data object Sanitized Data Record (see Table 6).

TABLE 6

| Object | Tag | Modification |
| --- | --- | --- |
| Application PAN | '5A' | Replace digits after the first 6 and before the last 4 with 'F'. If the PAN is less than 16 digits long, all digits except for the last 4 must be replaced with 'F'. Note: Application PAN Sequence Number is part of the Sanitized Data Record and may be printed on the receipt. |
| Track 2 Equivalent Data | '57' | Removed |
| Track 1 Data | '56' | Removed |
| Track 2 Data | '9F6B' | Replace digits in the PAN after the first 6 and before the last 4 with 'F'. If the PAN is less than 16 digits long, all digits except for the last 4 must be replaced with 'F'. |

The redaction of the copy of the Discretionary Data will be performed as described in Table 7 and results in the data object Sanitized Discretionary Data.

TABLE 7

| Object | Tag | Modification |
| --- | --- | --- |
| DD Card (Track1) | '9F1F' | Removed |
| DD Card (Track2) | '9F20' | Removed |
| Torn record | | Removed |

Integrity and Confidentiality of Sensitive Transaction Data

The Reader 3 must protect the transaction data against modification and the sensitive transaction data against eavesdropping so that it may be sent securely to the Server 4. It is therefore protected between Reader Process M and Server Process A using an authenticated encryption protocol implemented in Process O.

Reader Process O will encrypt the Data Record and Discretionary Data returned by the Kernel and protect the integrity of both plus the Outcome Parameter Set of the transaction using SK3. Server Process O will decrypt the data and will reject any transaction for which authentication fails.

The combination of the encrypted data and the data protected for integrity are referred to as the Protected Transaction Data. The data that are only protected for integrity are put in template 'FF8131'; the data that are encrypted and integrity protected are located in primitive data object 'DF8132'.

Encryption and authentication is done according to Section 11 with the following parameters:

The data that will be used for the authenticated but unencrypted data A are the data listed above for template 'FF8131'.

The data that will be used for encrypted authenticated data D are the data listed above for 'DF8132'. The plaintext data comprises the concatenated TLV data items without a template. When decrypted the result will be a list of TLV data items.

The concatenation of RMC∥SMC will be used for S. RMC will be incremented after use.

The key used is SK3.

When the Server 4 sends to the Terminal 2 a response indicating whether a transaction was approved or declined, it does so with an AUTH_REPLY or a CONFIRM signal with the outcome as a parameter.

This outcome is protected in a manner similar to the transaction data sent to the Server 4 using authenticated encryption according to Section 11. In this case, the Signal contains template 'FF8111', with (at least) the following data elements:

Transaction Sequence Counter (TSC, tag '9F41')

It may also include:

Transaction Outcome

Authorisation Response Code

Authorisation Code

Authentication is done according to Section 11 with the following parameters:

The data for template 'FF8111' is the unencrypted but authenticated data A.

The concatenation of RMC∥SMC will be used for S. SMC will be incremented after use.

The key used is $SK2_{Serv}$.

There is no encrypted data D.

There is no reason for the Server 4 to send PAN data to the Terminal 2—if it does so then the PAN must be redacted in a manner similar to the way that it was sanitized by the Reader 3 when sent to the Server 4.

When the Terminal 2 receives the message it passes it to the Reader 3 for validation. The Reader 3 first checks that SMC received is greater than $SMC_{Read}$ and if it is not it aborts processing by returning a STOP signal. It then attempts to validate the message. If the validation fails it returns a STOP signal. If it succeeds then it updates $SC_{Read}$ to the value it received and indicates success to the Terminal 2.

Result

The result of this process is either an authenticated message containing the transaction data plus other data securely transferred from Reader 3 to Server 4 or an error.

5.8 Card Data Authentication During Transaction Processing

The card data authentication is based on a challenge response mechanism.

The challenge is the Unpredictable Number and the response is the card's Application Cryptogram (AC) for Chip transactions or Dynamic CVC3 (dCVC3) for MagStripe transaction. A Chip transaction may also include a Combined Data Authentication (CDA) signature.

The algorithm for generating UN in the Reader 3 is described first, followed by a description on how UN is generated and validated in the Server 4.

After Reader 3 authentication, the Reader 3 possesses a first Pre-image $P_{Read,0}$ and it has an $UN_{Read,1}$ available for the first transaction (see Section 5.5).

More generally, one can say that at the start of transaction n, the Reader 3 has a Pre-image $P_{Read,n-1}$ and a $UN_{Read,n}$.

At the end of transaction n, a new value $P_{Read,n}$ is calculated.

If a card response was obtained, even if declined, then the calculation includes card data and the following algorithm is used:

If the transaction used EMV mode $P_n$=SHA-256[$TSC_{READ}$, $P_{n-1}$, $AC_n$], with $A_n$ denoting the AC (tag ' ') obtained during this $n^{th}$ transaction.

or if the transaction used MagStripe mode $P_n$=SHA-256 $TSC_{READ}$, $P_{n-1}$, Track 2 $Data_n$], with Track 2 $Data_n$ denoting the Track 2 Data (tag ' ') obtained during this $n^{th}$ transaction.

If a transaction fails, so that Track 2 Data or an AC is not available, the above calculations are still performed but AC or Track 2 Data are omitted when calculating $P_n$.

The following algorithm is used:

If the transaction used EMV mode $P_n$=SHA-256[$TSC_{READ}$, $P_{n-1}$]

or if the transaction used MagStripe mode $P_n$=SHA-256 $TSC_{READ}$, $P_{n-1}$]

In all the above cases, the UN for the next transaction is computed as:

$UN_{n+1}$=SHA-256 [$P_n$]

In a similar way, after Reader 3 authentication, the Server 4 possesses a first Pre-image $P_{Serv,0}$ and it has an $UN_{Serv,1}$ that is expected to have been used by the Reader 3 for the transaction with TSC equal to 1.

More generally, one can say that when the Server 4 has received all AUTH Signals up to and including $TSC_{Serv}$ equal to equal to m−1, then the Server 4 has a Pre-image $P_{Serv,m-1}$ and a $UN_{Serv,m}$.

When the Server 4 receives an AUTH Signal, it retrieves the TSC (tag '9F41') from Discretionary Data in 'DF8132'.

If TSC is greater than $TSC_{Serv}$+1, then it will store the request but not process it, until it $TSC_{Serv}$ has reached the value TSC−1.

If TSC is smaller than or equal to $TSC_{Serv}$, then the AUTH Signal is ignored.

If TSC is equal to $TSC_{Serv}$+1, then the Server 4 checks the value of UN and, if correct, generates a new value.

For UN validation and generation, the Server 4 retrieves UN (tag '9F37') from 'DF8132', either from the Data Record (tag 'FF8105') or from the Discretionary Data (tag 'FF8106').

If UN is present in the Data Record, then it concerns a Chip transaction and the Server 4 should also retrieve the AC (tag '9F26'), when present If UN is present in the Discretionary Data, then it concerns a MagStripe transaction and the Server 4 should also retrieve the Track 2 Data (tag '9F6B'), when present It compares the retrieved UN with $UN_{Serv,m}$. When different, the Server 4 rejects the transaction and sends a STOP("Logoff") to stop the session.

The Server 4 calculates $P_m$ as follows:

If AC is present, then $P_m$=SHA-256[TSC, $P_{m-1}$, AC]

If Track 2 Data is present, then $P_m$=SHA-256[TSC, $P_{m-1}$, Track 2 Data]

If neither AC nor Track 2 Data are present, then $P_m$=SHA-256[TSC, $P_{m-1}$]

The UN for the next transaction is computed as $UN_{m+1}$=SHA-256 [$P_m$]

The above embodiment requires that the Server 4 receives all transactions and that no TSC values are lost. This requirement must then also be implemented in the Terminal 2: it must send all transactions received from the Reader 3 to the Server 4 in a reliable manner.

An alternative embodiment imposes the requirement on the Terminal 2 that only transactions that include an AC or Track 2 Data need to be sent and that these transactions are sent in ascending order of TSC.

This then allows the Server 4 to detect transactions that did not include an AC or Track 2 Data and fill this gap autonomously.

CDA validation is done as per [EMV Book 2].

Additional information on UN handling may be found in Section 12.

Result

As far as a genuine unpredictable number is used in combination with the correct CA Public Keys, the transaction data exchanged with the card (e.g. Amount, Authorized and Currency Code) and the card date (e.g. PAN, AC) have been authenticated for integrity and authenticity.

5.9 Logout

The logout process can be initiated by the Server 4 or by the Terminal 2.

On logout, the Terminal 2 must ensure that there are no pending transactions still to be sent to the Server 4 (including torn transaction) and must send them if necessary and if possible.

It will then close the session with the Server 4 and request that the Reader 3 erase its copies of P, UN, $SK1_{Read}$, $SK3_{Read}$ and $SK2_{Read}$.

When the Server 4 detects the closure of the communications channel it will complete processing of any transactions currently in progress then erase its copies of P, $SK1_{Serv}$, $SK3_{Serv}$ and $SK2_{Serv}$ Result All data that have 'S' and 'T' as qualifier are erased from Terminal 2, Reader 3 and Server 4.

6. Terminal 6.1 Processes

Terminal 2 processes are:
  Process T(erminal management)
  Process U(ser interface)
  Process D(isplay)
  Process L(ogin)
  Process I(nitialization)
  Process C(ommunication)
  Process B(uffer)

Process C

Process C will authenticate the Server 4 by checking the CN used in establishing the SSL/TLS session and check the authenticity and integrity of the Signals received from the Server 4. It will also protect the data exchanged with the Server 4 using SSL/TLS.

Every Signal received from a Terminal 2 process is forwarded to the Server 4.

Every Signal received from the Server 4 is forwarded to Process L, Process I or Process B, depending on which process is active.

Process L

Process L collects the Merchant ID, Terminal ID and the Clerk's credentials and puts them together with a timestamp and authentication token T1 into a LOGON Signal for to the Server 4.

The LOGON_REPLY Signal from the Server 4 includes $Seed_{UN}$. Process L uses $Seed_{UN}$ to calculate Token T2 that is then passed to the Reader 3 in a RDR_AUTH Signal after which Process L deletes its cached copy of the Clerk's credentials (their password).

Process L forwards the RDR_AUTH_REPLY Signal from the Reader 3 to the Server 4, erases $PWD_{Term}$, activates Process I and goes dormant. It will not be required again during this session.

If at any time Process L receives a STOP Signal, then it will delete any cached copy of the Clerk Password and any transient data generated or being generated for the construction of tokens.

If the Reader 3 is the source of the STOP Signal, then Process L forwards the STOP Signal to the Server 4. Conversely, if the Server 4 is the origin of the STOP Signal, then the Terminal 2 forwards the STOP Signal to the Reader 3.

Process I

Upon receipt of an UPDATE Signal from the Server 4, Process I(nitialization) parses the Terminal data, puts them in the data base and forwards the UPDATE Signal to the Reader 3.

If Processes B and T have not yet been activated by Process I and if the UPDATE Signal includes Operational Status (Tag 'XYZ'), then Process I will inspect its value:
  If the most significant bit in the first byte set, then Process I
    Sets ActCumAmountNoComms to zero
    Displays EndOfSession through process D indicating the date & time that this session is valid until.
    Activates Process B and Process T.

Initialization is now completed and transaction processing can start. Process I goes dormant while remaining persistent. Process I is woken up by any subsequent UPDATE Signal.

If Processes B and T have been activated already by Process I and if the UPDATE Signal includes Operational Status (Tag 'XYZ'), then Process I will inspect its value:
  If the most significant bit in the first byte not set, then Process I sends an ABORT Signal to the Reader 3—to abort any transaction in progress because of an error or anomaly.

Transaction processing is suspended.

Upon receipt of a STOP Signal from the Reader 3, Process I will erase its database (all the data that are labelled 'S' or 'T').

If the Reader 3 is the source of the STOP Signal, then Process I forwards the STOP Signal to the Server 4. The Reader 3 will send such a STOP signal if there is a problem with the validation of an UPDATE signal prior to activation of Process B.
  Conversely, if the Server 4 is the origin of the STOP Signal, then the Terminal 2 forwards the STOP Signal to the Reader 3.

Process T

Process T is responsible for initiating a transaction.

For processing transactions, Process T sends the following Signals:
  ACT(ivate)
  NOTIFY Process T may receive the following Signals:
  OUT
  STOP
  SIG(nature)

Figure 18:
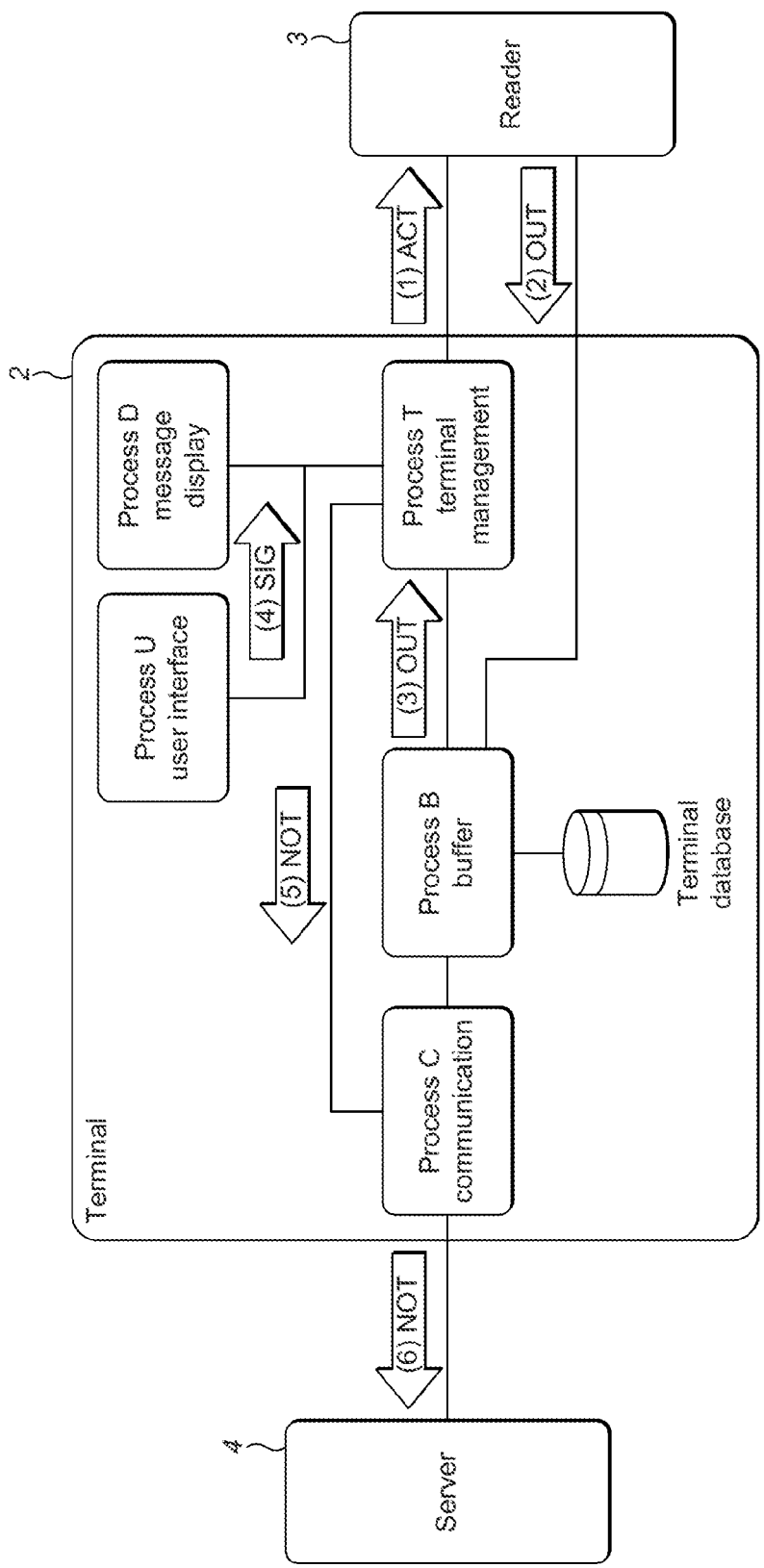
FIG. 18 shows Process T performed by the Terminal in an embodiment.

For Process T, the different Signals occurring during normal processing are illustrated in FIG. 18.

Before sending an ACT Signal, Process T performs the following checks:
  LimitMaxCumAmountNoComms—ActCumAmountNoComms Transaction Amount
  Current Date&Time not later than EndOfSession
  the most significant bit in the first byte of Operational Status (Tag 'XYZ') is set If any of these checks fail, the transaction cannot start and Process T sends an MSG Signal to Process D.

If all checks pass, Process T sends and ACT Signal to the Reader 3. Relative to [READER], the ACT Signal also includes the Transaction Sequence Counter ($TSC_{Term}$).

The OUT Signal received from Process B includes Template 'FF8110', containing a combination of the following data objects:
  the transaction status
  the Sanitized Data Record and
  the Sanitized Discretionary Data The transaction status has a value "APPROVED", "DECLINED", "END APPLICATION" or "ONLINE REQUEST"

If the transaction status is
"APPROVED", "DECLINED" or "END APPLICATION", then Process T informs the merchant/cardholder of the outcome of the transaction.
"ONLINE REQUEST", then Process T informs the merchant/cardholder that an online transaction is in progress.

Process T increments $TSC_{Term}$ by 1 as described in [EMV Book 4].

If at any time Process T receives a STOP Signal, then it resets the most significant bit in the first byte of Operational Status (Tag 'XYZ') to zero so that no new transaction can start.

Upon receipt of a SIG Signal (from Process U), Process T prepares a NOTIFY Signal with the digital imprint embedded.

Process B
Process B will process the following Signals:
OUT from the Reader 3
CONFIRM(ation) from the Server 4, received through Process C
AUTH_REPLY from the Server 4, received through Process C
TIMEOUT (internally)
STOP from Reader 3 or Server 4
Process B will generate the following Signals:
AUTH to Process C
NOTIFY to Process C
OUT to Process T
CONFIRM to Reader 3
AUTH_REPLY to Reader 3

Process B also manages a buffer with transaction entries and two timers.
Such a transaction entry contains the following data:
A handle
A label
A status
Data from the OUT Signal
The handle is used for retrieving a specific entry.
The label can have any of the following values:
In Progress—if a first attempt of sending it to the Server 4 hasn't completed yet
Confirmed—if the Server 4 has confirmed receipt
Processed—if the Server 4 has authorized or declined the transaction
Pending—if a first attempt (and potentially further attempts) to reach the Server 4 have failed
Rejected—if the Reader 3 has rejected it
A timer can be started, extended and stopped. When a timer is started, it is given a handle and a time-out value. When it expires, it generates a TIMEOUT Signal that includes the handle.
As indicated above, Process B manages two timers:
A first timer TimEnt, linked to a particular transaction (or entry. This timer is used
To check that Process C delivers an AUTH_REPLY and (optionally) a CONFIRM Signal in time for a particular AUTH Signal.
In this case, its time-out value is set to p×1 sec, with p a configuration parameter.
Expiry of this timer indicates that Process C was not able to connect to the Server 4 or that the authorization response from the issuer did not arrive in time.
Expiry of this timer triggers exception processing and activates the second timer (TimGen).
To allow the Reader 3 to check the response from the Server 4.
In this case, its time-out value is set to n*100 msec, with n a configuration parameter.
Expiry of this timer is normal and indicates that the Reader 3 did not detect a problem with the cryptography of the CONFIRM or AUTH_REPLY Signal. If the Reader 3 rejects the CONFIRM or AUTH_REPLY Signal, it will send a STOP Signal prior to TimEnt timing out.
When TimEnt is started, its handle is set equal to the handle of the entry.
A second timer TimGen, that is generic and is used as trigger for sending outstanding transaction to the Server 4. Its time-out value is set to m*1 sec timer, with m a configuration parameter. When this timer is started, its handle is set equal to zero.

Figure 19:
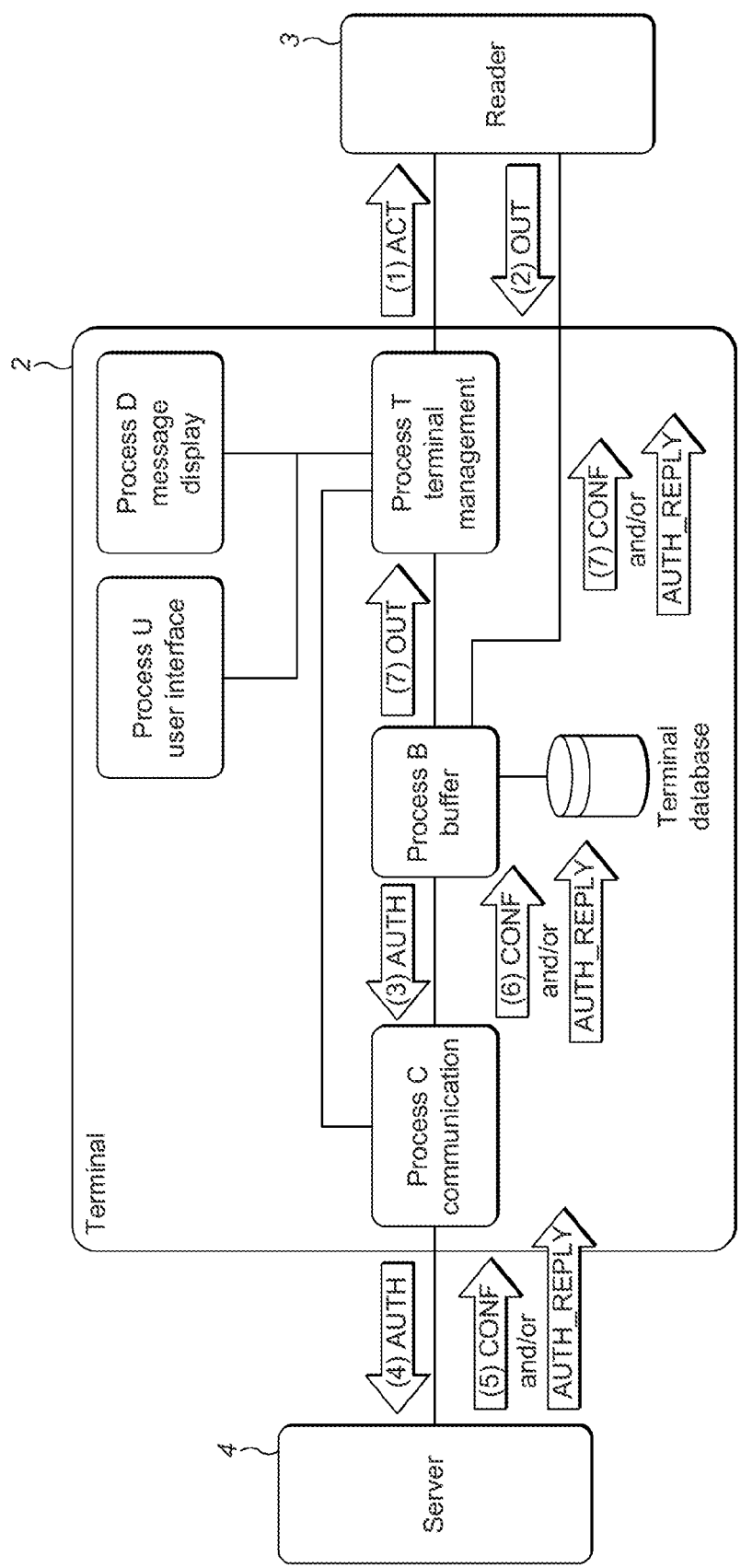
FIG. 19 shows communication paths during normal transaction processing by the Terminal in an embodiment.
Figure 20:
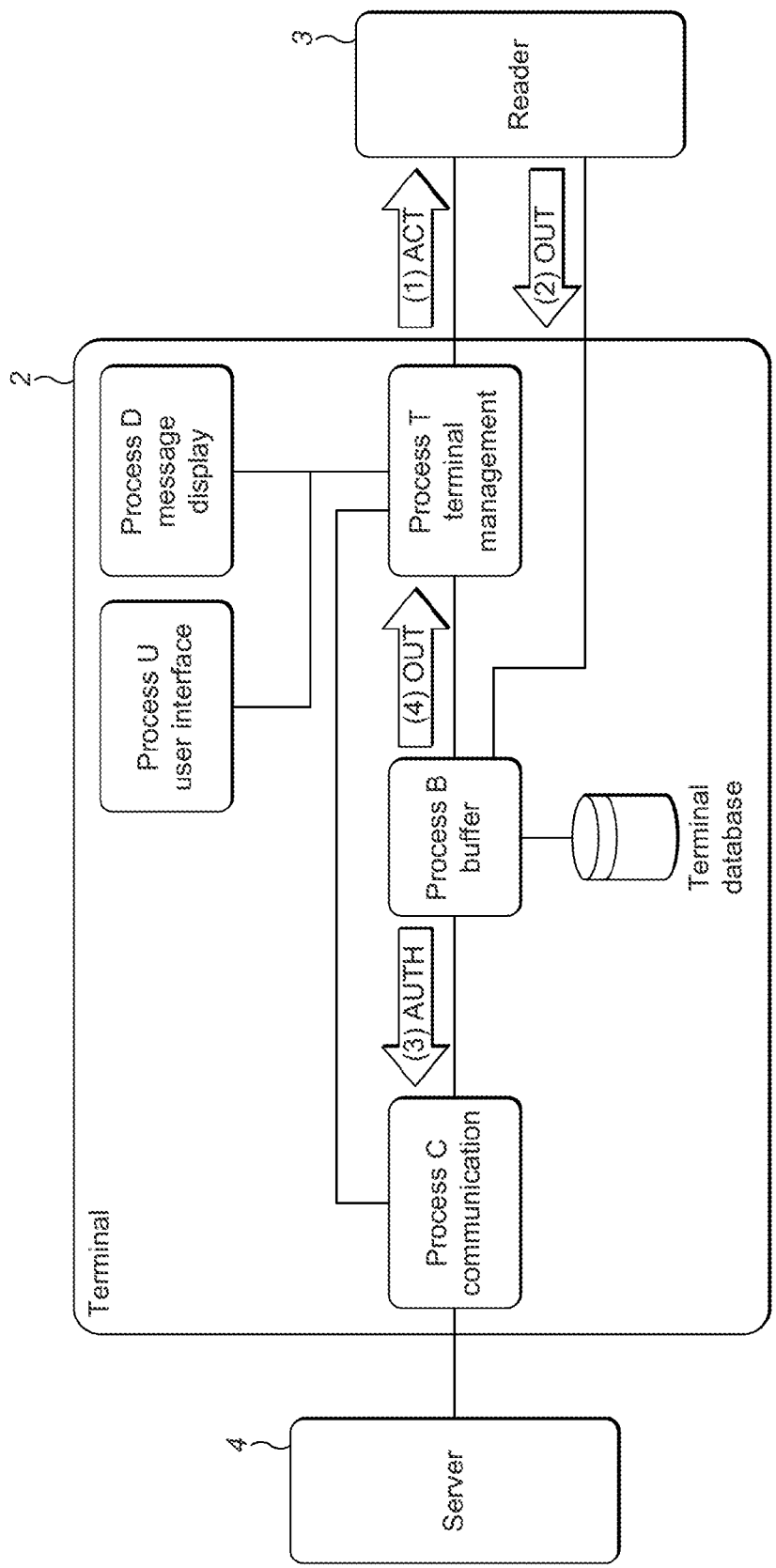
FIG. 20 shows communication paths during transaction processing by an embodiment of the Terminal when there is no connectivity.

Normal transaction processing is described first and illustrated in FIG. 19.
Transaction processing in case Process C cannot reach the Server 4 is illustrated in FIG. 20.
Upon receipt of an OUT Signal (from the Reader 3), Process B retrieves the Outcome Parameter Set (tag 'DF8129') from Template 'FF8131'.
If the Status in the Outcome Parameter Set is "APPROVED", "DECLINED", "ONLINE REQUEST" or "END APPLICATION", then Process B creates an entry in its buffer.
The entry is populated as follows:
The handle of this entry is set to $TSC_{Term}$
The label is set to "In Progress"
The status is set equal to the value of Status in the Outcome Parameter Set.
Data from the OUT Signal, including:
Template 'FF8131', with the authenticated data in cleartext
Primitive data object 'DF8132' with the encrypted data objects
Process B creates an AUTH Signal that includes:
Template 'FF8131'
Primitive Data Object 'DF8132'
It starts TimEnt with time-out value p×1 sec and with the handle equal to $TSC_{Term}$. It then sends the AUTH Signal to Process C (and hence to the Server 4).
Upon receipt of a CONFIRM Signal or AUTH_REPLY Signal, Process B extracts the TSC (tag '9F41') from template 'FF8111' and selects the matching entry in its buffer. If there is no such entry, the Signal is discarded.
If there is an entry, then Process B updates this entry as follows:
If template 'FF8111' includes the transaction authorization status then this value is used to update the entry's status by means of the following data objects. The transaction authorization status is retrieved from:
Transaction Outcome (tag ' ').
Authorisation Response Code
Authorisation Code
Subsequent to this update, if the entry's status is "APPROVED", "DECLINED" or "END APPLICATION", then Process B
labels the entry as "Processed"
stops timer TimEnt and
restarts it with time-out value n*100 msec If the status is "ONLINE REQUEST", then Process B
labels the entry as "Confirmed"
extends timer TimEnt with an additional n*100 msec
The (n*100 msec) timer should only time out after the Reader 3 has had a chance to validate the authenticity and integrity of the contents of template 'FF8111'. If the Reader 3 detects an error, it will send a STOP Signal that then shuts down the system.

If the Reader 3 finds no error with the CONFIRM or AUTH_REPLY Signal, the n*100 msec timer will hit for an entry that is labelled "Confirmed", "Processed" or "Rejected". Upon receipt of this TIMEOUT Signal, Process B deletes the entry if it is labelled "Processed".

Process B sends an OUT Signal to Process T which will include template 'FF8110' that it generates from the template 'FF8131' data that it received from the Reader 3 including:
the entry's status
the transaction status
the Sanitized Data Record and
the Sanitized Discretionary Data Upon receipt of a TIMEOUT Signal, Process B examines the handle. If the handle is different from zero, then TimEnt has expired. If the handle is zero then TimGen has expired.

If TimEnt has expired then Process B will check the label of the matching entry in its buffer.
If the label is "Processed", then the entry is removed from the buffer.
If the label is "InProgress", no feedback from the Server 4 has been received.

Depending on its configuration, the transaction status and transaction history, Process B checks whether the Clerk wants to accept the transaction without Server 4 confirmation (through interaction with Process D and Process U—not illustrated in FIG. 20.
If the entry's status indicates "APPROVED" or "ONLINE REQUEST" then Process B requests confirmation whether this offline/online transaction should be accepted without Server 4 confirmation.
If the response is yes, then
Amount, Authorized is added to ActCumAmount-NoComms: (ActCumAmountNoComms+= Amount, Authorized).
The entry's status is changed to "APPROVED
If the response is no, then the entry's status is changed to "DECLINED"
In both cases, the entry is relabelled to "Pending".
Process B will start TimGen with time-out value m*1 sec and a zero handle.
Process B sends an OUT Signal to Process T that includes
Template 'FF8110' generated from the template 'FF8131' received from the Reader 3, including
the entry's status
the Sanitized Data Record and
the Sanitized Discretionary Data
If the matching entry has a label "Confirmed", then the transaction has been acknowledged but the authorization status is not known.
Process B checks whether the Merchant wants to accept this transaction for which authorization is still pending. It does so through interaction with Process D and Process U—not illustrated in FIG. 20.
If the response is yes, then the entry's status is changed to "APPROVED
If the response is no, then the entry's status is changed to "DECLINED"
In both cases, the entry is relabelled to "Pending".
Process B will start TimGen with time-out value m*1 sec and a zero handle.
Process B sends an OUT Signal to Process T that includes
Template 'FF8110', generated from the template 'FF8131' received from the Reader 3 including
the entry's status
the Sanitized Data Record and
the Sanitized Discretionary Data
Process B will start TimGen with time-out value m*1 sec and a zero handle.

If TimGen has expired then Process B will check whether its buffer is empty. If not empty, then Process B goes through the different entries in ascending order of value of the handle.
For each entry that is labelled
"In Progress" or "Pending", it sends an AUTH Signal to Process C with the following data from the entry.
Template 'FF8131'
Primitive data object 'DF8132'
"Confirmed" or "Rejected, it sends a NOTIFY Signal to Process C with the following data from the entry.
Template 'FF8130', including the entry's label and status and the TSC from the corresponding AUTH signal
Process B (re)starts TimGen with time-out value m*1 sec and a zero handle.

If at any time Process B receives a STOP Signal, then it forwards the Signal
Process T
To the Reader 3, if the Server 4 is the source of the STOP Signal,
To the Server 4, if the Reader 3 is the source of the STOP Signal
Each entry in its buffer with label "Processed" is re-labelled to "Rejected".
Process B informs the Server 4 of the current status of its buffer. For each entry in its buffer, Process B sends a NOTIFY Signal to Process C with the following data from the entry.
Template 'FF8131'
Primitive data object 'DF8132'
Process B then starts TimGen with time-out value m*1 sec and a zero handle.
Process U
Process U, in combination with Process D, is used to capture the transaction amount and transaction type.
This information is used to populate the ACT Signal that is sent to the Reader 3.
Depending on the mobile device 1 capabilities (for example touchscreen), Process U may also be used for capture the customer's signature and send it to process T (in SIG Signal).
The digital imprint of the signature is part of the transient transaction data (see Section 6.2) that are included in the NOTIFY Signal for the Server 4.
Process D
Process D, in combination with Process U, is used to display the transaction amount, currency and transaction type prior to and (together with outcome) after the transaction.

6.2 Database

Figure 21:
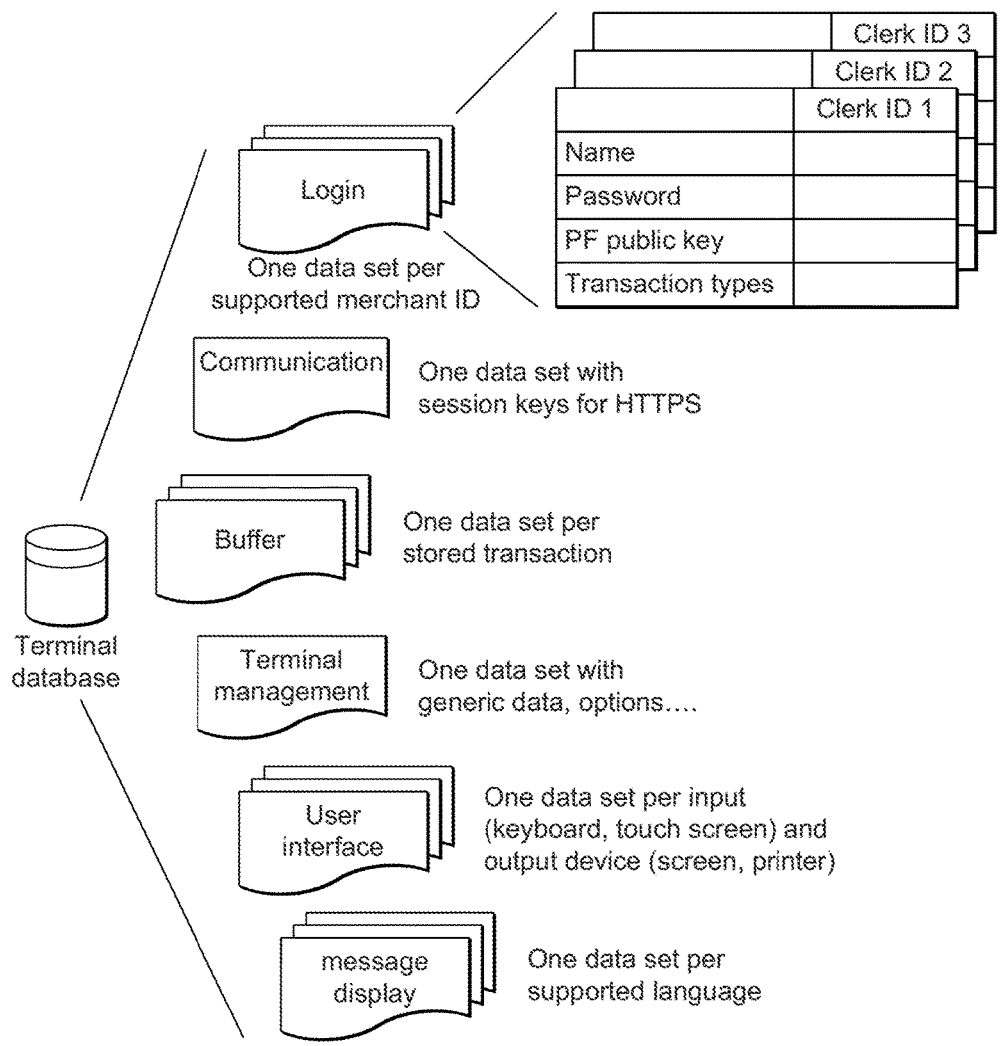
FIG. 21 shows persistent datasets in the Terminal database according to an embodiment.

As indicated in FIG. 21, the Terminal 2 maintains a database that is divided into datasets. A dataset can contain either persistent data or transient data:
For a dataset that contains persistent data, its content can persist over several Logon sessions and be relevant across Clerk IDs.

Logon data, including the different Clerk IDs, each with its Logon parameters, MPOS Solution Provider Public Key and supported transaction types.

Terminal management data, such as operating system, application versions, etc.

The Terminal's user input and output capabilities

Messages to be put on display, in one or more languages; this includes default language, the currency symbol to display for each currency code and the number of minor units for that currency code, a number of message strings in the default language and potentially other languages A persistent data set may be created at the start of a Logon session, as a copy of a one of the persistent datasets above and populated with Clerk (ID) specific data. Its content only exist during a Logon session and be Clerk ID specific. This includes:

Communication data, including the keys for the HTTPS session between the Terminal 2 and the Server 4

Initialization data, including the activated transaction types, currency code, . . .

Buffered transaction data that are stored while awaiting for the Server 4 to come back online A dataset that contains transient data is created at the beginning of a transaction as a copy of a dataset with persistent data and populated with transaction-specific data. Its content is used to initialize one of the processes, can be updated as part of transaction processing by the process or as a result of a Terminal Signal or a Reader 3 Signal, does not persist beyond the transaction in progress.

An overview of the different persistent datasets is given in FIG. 21.

7. Reader 7.1 Processes

Reader 3 processes are implemented as per [READER], except that

Process I is a new process that is not described in [READER] and that is responsible for initialization (or configuration) of the Reader database.

Process K will provide additional data, to allow the Server 4 to repeat the CDA validation.

Process M will store additional data received the Terminal 2 and Process S generate the Unpredictable Number using the algorithm described in Section 12 and make it available to the Kernel(s); the Server 4 will check whether this algorithm was followed. For this purpose, Process I will pass $Seed_{UN}$ received from the Terminal 2 to Process M. Upon receipt of $Seed_{UN}$, Process M will generate Pre-image P and an initial UN value, erasing $Seed_{UN}$ afterwards. It will then retain P and UN for subsequent transactions, generating new values as defined in this document.

manipulate the Data Record and the Discretionary Data returned by Process K in the OUT Signal to create a sanitized version for the Terminal 2 (in other words, the Sanitized Data Record and the Sanitized Discretionary Data) and prepare a primitive data object with sensitive data for encryption and authentication by Process O.

will include in Outcomes the additional data necessary for the Server 4 to validate CDA processing for which purpose Process K will provide the extra data needed.

Process O is a new process that is not described in [READER] and that is responsible for cryptographic operations. It will encrypt sensitive data received from Process M and provide integrity protection of the Outcome Parameters. The combination of encryption and authentication results in Protected Transaction Data that is sent to the Server 4.

Process P may implement NFC instead of [EMV Book D]

Process D is managed by the Terminal 2.

Process I

Process I is responsible for initialization of the Reader 3 database. For this purpose, it receives and processes one of the following Signals:

UPDATE

STOP

Process I does not generate any Signal.

An UPDATE Signal includes TLV data in a template 'FF8111' and primitive data object 'DF8122'. Template 'FF8111' contains Terminal data while tag 'DF8122' contains enciphered Reader 3 data. Once deciphered the resultant plaintext is a list of TLV values intended for the Reader 3.

Process I updates the Reader 3 data base with the decrypted data from tag 'DF8122' (decryption is done by Process O).

Process I will also inspect template 'FF8111' containing Terminal data. If this template includes the data item Operational Status, then Process I.

For the different RIDs, check that the signature over the set of keys initialization data include the Payment System Public Keys and a per RID. The Reader 3 checks this signature to verify the correctness of the CA keys installed using a public key (PubK3) hardcoded in the Reader 3 for this purpose. An error is reported back to the Terminal 2 (through a STOP("Logout") Signal).

Activates all dormant Reader 3 processes required for Transaction Processing, if the most significant bit in the first byte of Operational Status is set (to 1). Processes required for Transaction Processing include Processes M, K, S and P.

Deactivates all Reader Processes that are specific to Transaction Processing, if the most significant bit in the first byte of Operational Status is reset (to 0). Processes specific to Transaction Processing include Processes K, S and P.

Upon receipt of a STOP("Logout") Signal, Process I

Clears the Reader 3 data base by erasing all the data labelled 'S' and 'T'.

Process K

Compared to [READER], there are two modifications to Process K:

The OUT Signal includes additional data

The UN is sourced from Process M and not generated by Process K itself

Process K generates an Outcome as per [READER], that includes:

Outcome Parameter Set (tag 'DF8129')

Data Record—if "Data Record Present" is set in Outcome Parameter Set

Discretionary Data—if "Discretionary Data Present" is set in Outcome Parameter Set In addition to the above, the OUT Signal returned by Process K will also include:
  The ICC Public Key Certificate ('9F46')
  Template 'XYZ' that includes
    The TLV data returned by the card in 'signed' records—in the order indicated by the AFL
    The AIP, if Static Data Authentication Tag List exists
  Template 'ABC' that includes the concatenation of
    the command data included in the Get Processing Options—in the order as they were sent to the card
    the command data included in the $1^{st}$ Generate AC command—in the order as they were sent to the card
    the response data from the $1^{st}$ Generate AC—in the order they were received from the card and including the SDAD
  Template 'DEF' that includes the concatenation of
    CA Public Key Index ('8F')
    Issuer Public Key Certificate ('90')
    Issuer Public Key Remainder ('92')
    Issuer Public Key Exponent ('9F32')
    ICC Public Key Remainder ('9F48')
    ICC Public Key Exponent ('9F47')
In more detail, Process K (in state Idle or at the end of the previous transaction—in lieu of step S1.E9 and step S78.15)
Process M
  For IC-MPOS, in addition to the requirements defined in [READER], Process M is also responsible for
    the generation of a new Unpredictable Number for the next transaction
    the sanitization of the data records by removing unnecessary data and redacting sensitive data that the Terminal 2 will need and
    providing the sanitized data as input to Process O in template FF8131 and tag DF8132.
  With regard to [READER], Process M performs additional processing for the following received Signals:
    ACT
    OUT, received from Process S
    OUT, received from Process K
    STOP, with parameter 'Logout'
    OUT, sent to Process O
  Upon receipt of the ACT Signal from the Terminal 2 (through Process C), Process M stores TSC in $TSC_{Read}$ (tag '9F41').
  Upon receipt of the OUT Signal from Process S, Process M stores the Selected Combination (tag 'DF812E')
  Upon receipt of a STOPSignal, Process M:
  Flushes any pending transaction data to the Terminal 2 for forwarding to the Server 4 if possible
  Erases the transient data from the Reader 3 database.
  The receipt of the OUT Signal from Process K is the trigger for (in sequence):
    the generation of a new Unpredictable Number
    the sanitization of the data records
    sending an OUT Signal to Process O
  The OUT Signal from Process K includes a combination of the following:
    Outcome Parameter Set (tag 'DF8129')
    Data Record (tag 'FF8105')
    Discretionary Data (tag 'FF8106')
    The ICC Public Key Certificate ('9F46')
    A Template that includes the card data for Hash validation
    A Template that includes the concatenation of the command data of the Get Processing Options and $1^{st}$ Generate AC command as well as the response data to the latter.
    Template 'DEF' that includes the non-sensitive public key information
Sanitization of the Data Records
  Sanitization of the Data Record and Discretionary Data results two additional data objects, the Sanitized Data Record and Sanitized Discretionary Data and is described in Section 5.7. These records contain sanitized versions of the Data Record and Discretionary Data where the PAN has been redacted to replace most of the digits with the exception of the final four.
  Sanitization of the data records includes adding the necessary data object into the Discretionary Data for the Server 4 to be able to repeat the CDA processing and double check the terminal risk management.
  The Data Record created by Process M is a copy of the Data Record received from Process K in the OUT Signal (and thus the same as Table 4.7 and Table 4.8 of [READER]).
  The Discretionary Data created by Process M is based on the Discretionary Data returned by Process K in the OUT Signal as described in Table 4.9 and Table 4.10 of [READER], for a Chip Transaction and a MagStripe transaction respectively.
Generation of a New Unpredictable Number
  Process M generates a fresh Unpredictable Number, using the algorithm as described in Section 5.8. For this purpose, it uses the value of $TSC_{READ}$ received in the ACT Signal. The new value is stored in $UN_{Read}$ and is available for the next transaction.
OUT Signal to Process O
  Independent of the outcome of the transaction, Process M will always provide Process O (and therefore the Terminal 2) with an OUT Signal.
  The OUT Signal to Process O includes a combination of the following data objects:
    In template 'FF8131':
      Sanitized Data Record
      Sanitized Discretionary Data
      Outcome Parameter Set (tag 'DF8129')
    In Tag 'DF8132' ready for encipherment by Process O:
      Data Record (tag 'FF8105')
      Discretionary Data (tag 'FF8106')
      The ICC Public Key Certificate ('9F46')
      A Template that includes the card data for Hash validation
      A Template that includes the concatenation of the command data of the Get Processing Options and $1^{st}$ Generate AC command as well as the response data to the latter.
      A Template that includes the non-sensitive public key information
Process O
  Process O is responsible for the cryptographic processing on Signals that are sent to the Server 4 or that originate from the Server 4. Process O sends a STOP Signal to Process I or Process M—depending on which process is active—if authentication of a cryptographically protected message is not successful.
  Process O receives one of the following Signals:
    RDR_AUTH (Reader Authenticate, during logon)
    UPDATE (during initialization)
    OUT (during transaction processing)
    CONFIRM and AUTH_REPLY (during transaction processing).

Process O generates one of the following Signals:
RDR_AUTH_REPLY
OUT
STOP

Handling RDR_AUTH Signals

The RDR_AUTH Signal includes $T2_{TRUNC}$ and $Seed_{UN}$.

In response to the RDR_AUTH Signal, Process O will:

Generate random number R, session keys SK2 and SK3, Pre-image $P_{Read,0}$ and the first unpredictable number $UN_{Read,1}$ and store these in the Reader 3 database as $P_{Read}$ and $UN_{Read}$.

Concatenate R with $T2_{TRUNC}$ and encrypt the concatenation with hard coded RSA key PubK2 using RSA-OAEP.

Initializes the Reader Message Counter ($RMC_{Read}$) and the Server Message Counter ($SMC_{Read}$) to one and zero respectively.

The encrypted version of $R\|T2_{TRUNC}$ is returned to the Terminal 2 in a RDR_AUTH_REPLY Signal, as part of template 'FF8130'.

Process O then erases $Seed_{UN}$, R, R1 and R2.

Handling UPDATE, CONFIRM, AUTH_REPLY—Counter Management

Process O is responsible for the generic processing of the UPDATE, CONFIRM and AUTH_REPLY signals. For processing the Signals received from the Server 4 with tag 'DF8122', it uses $SK2_{Read}$ while for the Signals it generates with tag 'DF8132' it uses $SK3_{Read}$.

Sensitive data managed by Process O include $SK2_{Read}$ and $SK3_{Read}$.

If there is a problem with the authentication or the decryption, then Process O

Securely erases $SK2_{Read}$ and $SK3_{Read}$ by overwriting with random data

Sends a STOP ("Abort") Signal to Process I or Process M (depending on which process is active) and to the Terminal 2

Handling UPDATE Signals

An UPDATE Signal includes TLV data in a template 'FF8111' and encrypted data in tag 'DF8122'; template 'FF8111' contains (authenticated) Terminal data while tag 'DF8122' contains authenticated and encrypted Reader 3 data.

As described in Section 5.6, Process O will process:

template 'FF8111' as to be authenticated but unencrypted data A for the Terminal 2.

tag 'DF8122' as to be decrypted data D.

If there are no problems with the cryptography, Process O forwards the UPDATE Signal, with the decrypted data in tag 'DF8122', to Process I.

Handling CONFIRM and AUTH_REPLY Signals

The CONFIRM Signal and AUTH_REPLY Signal include TLV data in a template 'FF8111' which contains unencrypted data to be authenticated and tag 'DF8122' that contains the cryptographic data to authenticate it. The contents of 'FF8111' are intended for the Terminal 2 and the Reader 3 does not care what its contents are—it is merely providing a cryptographic service for the Terminal 2 in verifying its authenticity. Typically it will include the Transaction Sequence Counter (tag '9F41') of the transaction being authorized, the Transaction Outcome, Authorisation Response Code and Authorisation Code.

As described in Section 5.6, Process O will process template 'FF8111' as to be authenticated but unencrypted data A for the Terminal 2. There is no encrypted data D but the ciphertext in tag 'DF8122' is required to authenticate the data in 'FF8111'.

Handling OUT Signals

The OUT Signal received from Process M includes a combination of the following data objects:

In template 'FF8131':
Sanitized Data Record
Sanitized Discretionary Data
Outcome Parameter Set (tag 'DF8129')

In tag 'DF8132' ready for encipherment:
Data Record (tag 'FF8105')
Discretionary Data (tag 'FF8106')
The ICC Public Key Certificate ('9F46')
A Template that includes the card data for Hash validation
A Template that includes the concatenation of the command data of the Get Processing Options and $1^{st}$ Generate AC command as well as the response data to the latter.
A Template that includes the non-sensitive public key information Process O is responsible for the integrity and confidentiality protection of sensitive transaction data as described in Section 5.7 and as such it is responsible for processing the contents of Template 'FF8131' as data to be authenticated (A) and the contents of 'DF8132' as data to be encrypted (D), replacing the contents of 'DF8132' with the encrypted representation.

Process O forwards the updated OUT Signal to Process C. The updated OUT Signal includes:

Template 'FF8131', with the authenticated data in cleartext including Sanitized Data Record and Sanitized Discretionary Data Tag 'DF8132', the encrypted data objects Handling STOP Signals Upon receipt of a STOP("Logout") Signal, Process O
Securely erases $SK2_{Read}$ and $SK3_{Read}$ by overwriting with random data
Forwards the STOP("Logout") Signal to Process I or Process M (depending on which process is active)

Process P

The IC-MPOS solution, or device, may support the NFC protocol, rather than Book D-EMV Contactless Communication Protocol Specification (commonly referred to as EMV L1).

7.2 Database

The Reader 3 database is implement as per [READER], except that

Additional keys are present for Process M; this includes
Permanent data:
Public Key PubK2, matching private key PrivK2 in the Server 4
Public Key PubK3, used to verify the integrity of the payment system public keys
$MMI_{Read}$, the MPOS Merchant Identifier
Transient data:
$SK2_{Read}$ and $SK3_{Read}$, session keys to secure the communication with the Server 4
$SC_{Read}$, a sequence counter to avoid replay messages from the Server 4 the database and configuration data for Process D is managed by the Terminal 2;

the configuration settings for Process P may be defined according to NFC and not as defined in Annex A of [EMV Book D].

The configuration data for Process S and Process K must be available prior to the transaction. As indicated in another section of the present document, these data may be initiated by the Server 4 in full as part of the log-in session or refreshed partially on a per-transaction basis.

8. Server

8.1 Processes

Figure 22:
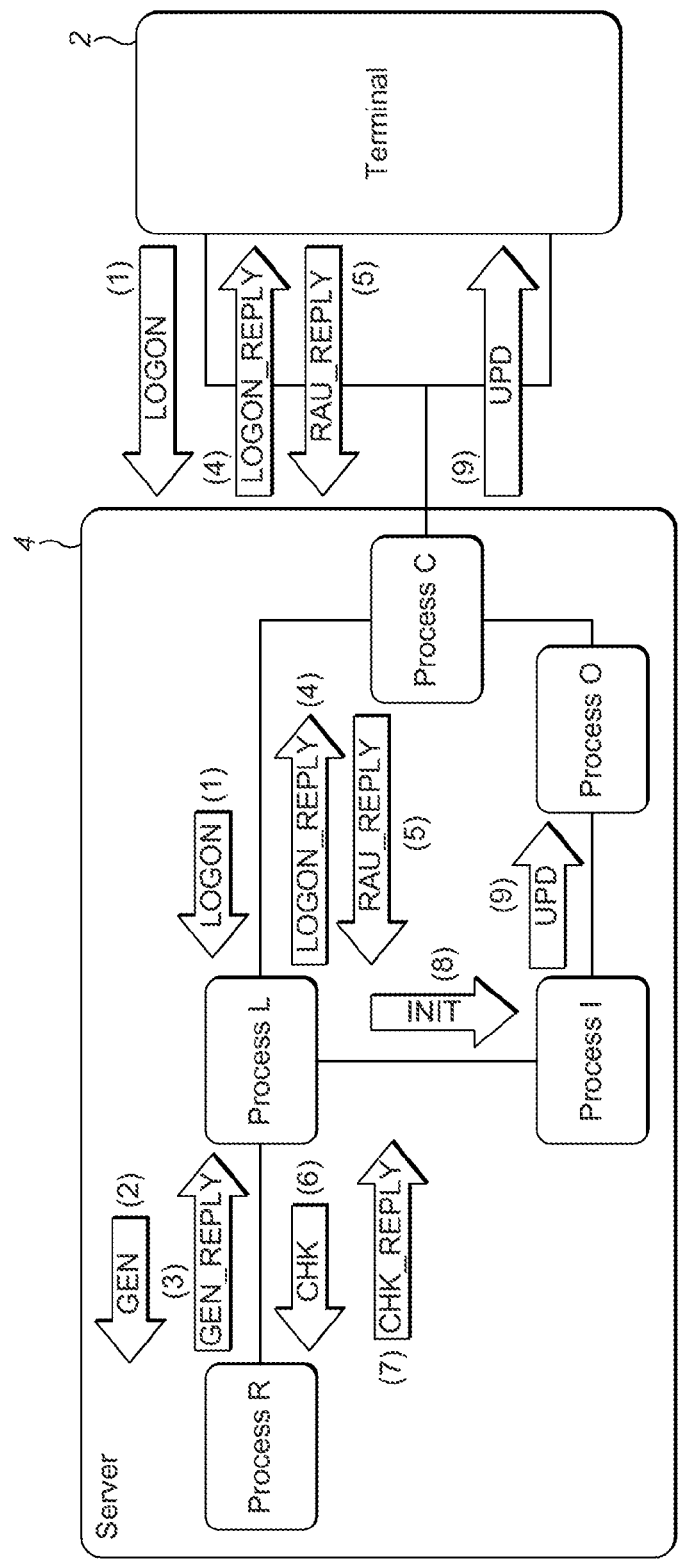
FIG. 22 shows communication paths during logon and initialisation processes performed by the Server according to an embodiment.
Figure 23:
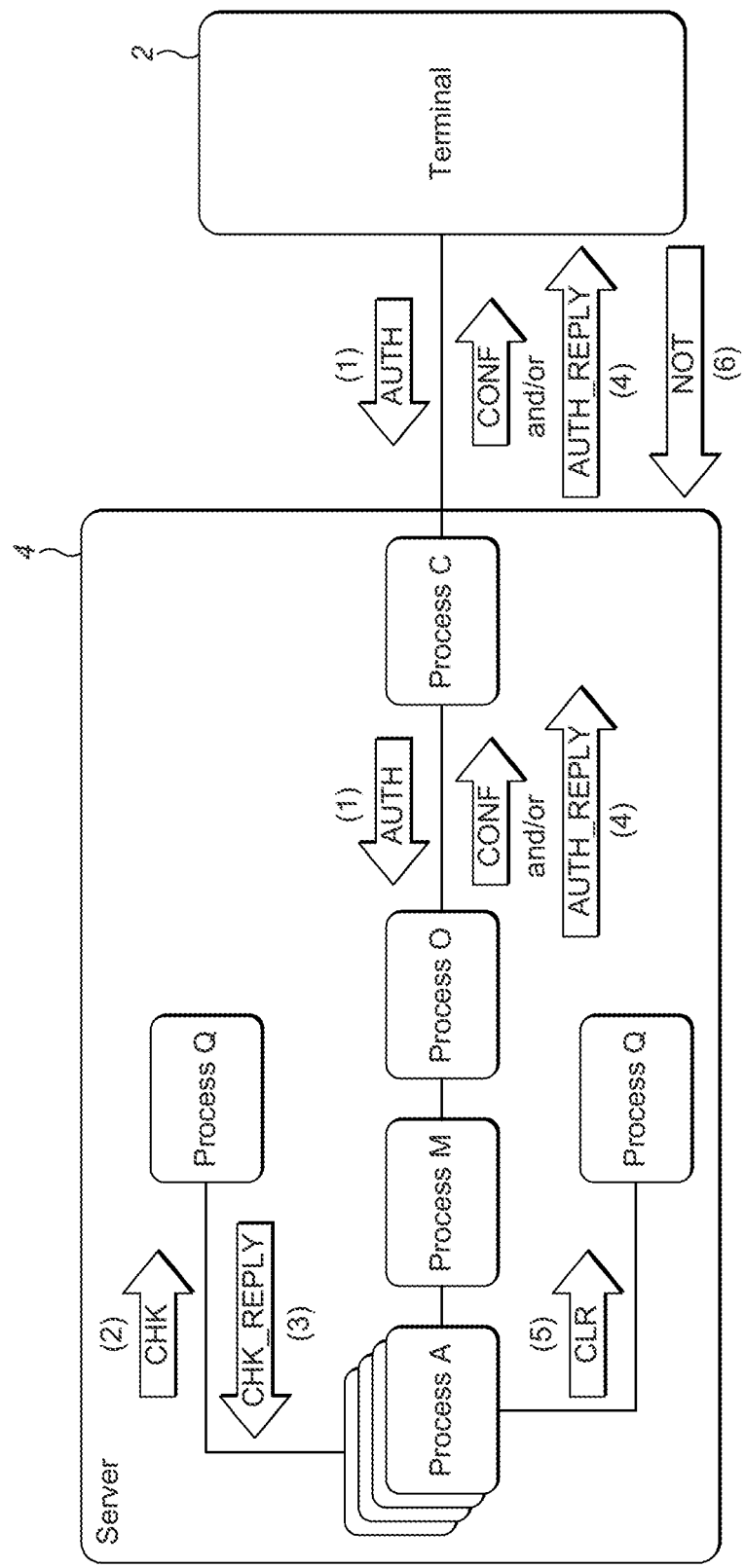
FIG. 23 shows communication paths during processes performed by the Server according to an embodiment.

Server processes are:
Process C(ommunication)
Process O(cryptographic processing)
Process L(ogin)
Process R(andom Number generation)
Process I(nitialization)
Process M(Server Management)
Process A(Card Authorization)
Process Q(Transaction Clearing)
See FIGS. 22 and 23.

Before a "payment session", i.e. an operation in which a payment is made, can be performed, the following should be ensured on the Server 4:
  The Merchant is registered with the MPOS provider
  The Clerk's account is registered with the Merchant
  The Device is registered with the Merchant. During this registration, the device database is populated with:
    the merchantID
    a merchant key: $MMI_{Term}$
    a unique deviceID
    a device key: $k_{Term}$ Copies of these 4 values are stored in the Server Database, respectively in the Merchant and Device tables.

Figure 24:
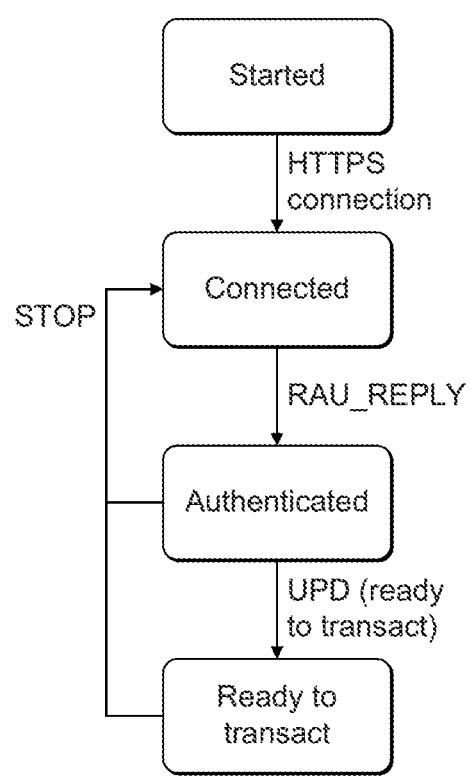
FIG. 24 shows operations of the Server according to an embodiment.

For each Clerk session, the Server processes follow the 3 phases shown in FIG. 24 and use a session state machine (stored the Session status) to adapt their behavior to the current phase:

Logon Phase

Each time a new connection request is received from a Terminal 2, a new session is created with its status set to "Started". A new instance of Process C and Process M are initiated to handle respectively the communication with the Terminal 2 and the management of the other processes.

Once process C confirms the successful creation of a HTTPS connection, it sets the session status to "Connected" and calls Process L to handle the login of the Clerk over this secured connection. The login also involves Process R which provides $Seed_{UN}$ which is returned in the LOGON_REPLY. It is then used to secure the connection between the Reader 3 and the Server 4. The login process is complete once the Server 4 has validated the data in the final step, which is conveyed by RAUTH_REPLY.

Once the Clerk's session is established, Process L sets the session status to "Authenticated", launches Process O and Process I to initialize the device.

Initialisation Phase

Process I handles the initialization of the Terminal 2 and Reader 3. When all the required parameters are up to date, Process I sets the session status to "Ready to Transact" and activates Process M and the different Processes A which will take care of the payment processing.

Processing Phase

Process M stores the incoming transactions in its Transaction history, a TSC ordered list of all transactions received during the session. It then selects one of the Processes A based on the type of transaction and forwards the unchanged transactions to it. There may be multiple Processes A available on the Server 4 for different payment brands. The chosen Process A authenticates the transaction and authorizes it offline or forwards it to the issuer for online authorisation. Process Q then handles the clearing of the authorized transactions for the different process A.

Process C

Process C manages the communication with the Terminal 2. It is responsible for ensuring:
  The connectivity with the Merchant mobile device (e.g. mobiles, tablets) over cellular or WiFi connection.
  The routing of the signals from the Terminal 2 to the Server Processes.
  The confidentiality, integrity and authenticity of the data by using HTTPS to create an SSL/TLS link.
  The resilience against network attacks (DDOS, Data injection)

Connection

When Process C on the Terminal 2 initiates an HTTPS connection, a Process C on the Server 4 is assigned to this session and sends the SSL certificate (including its Public key—PubK1) for Process C on the Terminal 2 to check. If the certificate is valid, Process C receives from the Terminal 2 a session key (SK1), encrypted with PubK1. SK1 is then used by both Processes C (on the Server 4 and the Terminal 2 side) as SSL/TLS session key.

When the HTTPS connection is established, Process C changes the session status to "Connected", launches Process L to handle the clerk login and starts routing the incoming and out coming signals.

Routing

Every Signal received from a Server 4 process is forwarded to the Terminal 2.

Every Signal received from the Terminal 2 is forwarded to Process L or Process M, depending on the type of signal (MsgID as described in Section 3.2), as shown in Table 8.

TABLE 8

| Signal | Destination |
| --- | --- |
| LOGON | Process L |
| RAU_REPLY | Process L |
| AUTH | Process M |
| NOT | Process M |
| STOP | Process M |

If the session status is not "Ready to transact", NOT and AUTH signals will not be accepted and must be discarded.

Process L

Process L identifies and authenticates the Clerk and the Terminal 2.

Upon receiving the LOGON signal from the Terminal 2 over HTTPS, Process L reads, in the enclosed template 'FF8130', the token $T1_{TRUNC}$ and the other elements of the signal contents ($MerchantID_{Term}$, $ClerkID_{Term}$, $DeviceID_{Term}$, $DateTime_{Term}$) and stores the following information in the session:
  $MerchantID_{Term}$
  $ClerkID_{Term}$
  $DeviceID_{Term}$ Process L then validates that the following elements for the MerchantID, ClerkID, DeviceID tuple:
  The Clerk and the Device are registered for this Merchant: a Clerk account with $ClerkID_{Term}$ and a Device with $DeviceID_{Term}$ exist in the database and are linked to the merchant account $MerchantID_{Term}$
  The Authentication timestamp isn't too old: $Abs(DateTime_{Term} - DateTime_{Serv}) < $ a server configurable time window (e.g. 5 min)
  Authentication timestamp wasn't used before: $DateTime_{Term} > DateTime_{LastLogon}$
  Signal content authenticity: $T1_{TRUNC,Term} = T1_{TRUNC,Serv}$ with $T1 = HMAC(k_{Serv}, s_{Serv})$. The $k_{Serv}$ for the requested DeviceID and $PWD_{Serv}$ for the Clerk are stored in the Server database and s is the concatenation of the following data:

$s_{Serv}=PWD_{Serv}\|MerchantID_{Serv}\|ClerkID_{Serv}\|DeviceID_{Serv}\|DateTime_{Term}$ If any of these checks fails, the Server 4 refuses the logon and sends a LOGON_REPLY signal with an error message, in a template FF8110:

- "Try_again": if $T1_{TRUNC}$ couldn't be authenticated or the timetamp is too old or used before: Terminal 2 should invite the Clerk to make a new login attempt.
- "Register_clerk": if the clerk isn't registered with this merchant: Terminal 2 invites the Merchant to register this device through his MPOS Service/Solution provider account.
- "Register_device": if the device is not registered with this Merchant: Terminal 2 should invite the Merchant to register this device through his MPOS provider account.

Alternatively, for the "Register_device" and "Register_clerk" errors, the Terminal 2 could ask for the Merchant account password and register respectively the device and/or the clerk directly from the device. In this case, the different configuration data ($MMI_{Term}$, Merchant ID, Device ID, $k_{Term}$) have to be sent to the device encrypted.

If the Clerk and Terminal 2 are authenticated, Process L requests a $Seed_{UN}$ from Process R. It sends this $Seed_{UN}$ to the Terminal 2 in the LOGON_REPLY signal in a template FF8110 with a "Success" message. Process R also generates the first UN pre-image $P_{Serv}=SHA-256[MMI_{Serv}, Seed_{UN}]$ and stores it in the session.

When it gets the RAU_REPLY signal initiated by the Reader 3, Process L deciphers the data $(R\|T2_{TRUNC})$ contained in a template FF8130 with the Server 4 private key PrivK2 and validates the authenticity of the token $T2_{TRUNC}$ (Tag TBD) received from the Reader 3. Process L calculates $T2=HMAC(k_{Serv}, s)$ and truncates 4 bytes to obtain $T2_{TRUNC}$. s is the concatenation of elements stored in the current session:

$s=PWD_{Serv}\|MerchantID_{Serv}\|ClerkID_{Serv}\|DeviceID_{Serv}\|Seed_{UN,Serv}$ If this check fails, the logon is rejected and Process L sends a STOP signal to Process M and stops.

If the token $T2_{TRUNC}$ is valid, Process L parses the random number R included in the signal by the Reader 3, and uses it to derive its versions of the session keys SK2 ($SK2_{Serv}$) and SK3 ($SK3_{Serv}$):

$SK2=AES(R1)[Seed_{UN,Serv}]$
$SK3=AES(R2)[Seed_{UN,Serv}]$

With R1: first 128 bits of R and R2: last 128 bits of R.

SK2 and SK3 are stored in the session and will be used by Process O to authenticate and encrypt the signals sent to the device (SK2) and to verify the authenticity and decrypt the signals from the Reader 3 (SK3), as described in Section 11.

Process L also initializes, in the session, the Server Message Counter ($SMC_{Serv}$) with a value of 1, the Reader Message Counter ($RMC_{Serv}$) and the Transaction Sequence Counter ($TSC_{Serv}$) both with a value of 0. The concatenation S of SMC and RMC will be used as nonces for the authenticated encryption used to securely exchange data with the Reader 3.

Process L sets the session status to "Authenticated" and sends the INIT signal to Process I which will start the initialisation of the Terminal 2 and Reader 3. The INIT signal doesn't need to carry any information as all the necessary parameters are stored in the session.

Upon receiving a STOP signal from Process M, Process L aborts the login and stops.

Process O

Like Process O in the Reader 3, Process O is in charge of:
- authenticating and decrypting the data from the Reader 3
- hashing and encrypting the data going to the Reader 3

Process O uses the CCM authenticated encryption as described in details in Section 5.

The encryption keys are:
- $SK2_{Serv}$ for messages from the Server 4 to the Terminal 2
- $SK3_{Serv}$ for messages received from the Terminal 2

For all message from and to the Terminal 2, Process O uses the nonce $S=RMC_{Serv}\|SMC_{Serv}$ as described in Section 3.2.

Process O also makes sure that the value $RMC_{Read}$ in a signal from the Reader 3 is always higher than the value stored locally ($RMC_{Serv}$) to prevent replay attacks. If $RMC_{Read}<RMC_{Serv}$ Process O sends a discards the signal and sends a STOP signal to Process M.

Process O increments the counter $SMC_{Serv}$ after sending a new signal to Process C (and to the Terminal/Reader) and updates the value of $RMC_{Serv}$ with the value contained in each new message received from Process C, but only after processing and forwarding it to its destination. Both $RMC_{Serv}$ and $SMC_{Serv}$ are stored in the current session.

If the authentication of the AUTH signal fails to prove that the transaction is genuine, Process O rejects the transaction and sends a STOP signal to Process M and a CONF signal to the Terminal 2 with the "END APPLICATION" indication.

Process R

The Server 4 must provide a fresh seed value for the UN at each new session. This seed will be used to generate UNs which will be used to authenticate the Terminal 2 in establishing communications with the Server 4 via Login and in the transaction processing as described in Section 5.

When it receives a GEN signal, Process R generates the $Seed_{UN}$ random number, and sends it back, to the Process I which requested it, in a GEN_REPLY signal and computes a first value of P as follows:

$P_{Serv}=SHA-256[MMI_{Serv}, Seed_{UN}]$

Note that with the logic described below, $TSC_{Serv}$ now represents the TSC that the Server 4 expects to see next from the Terminal 2 and will be stored in the session.

Process R is also responsible to validate the authenticity of the UN generated by the Reader 3, when it gets, in a CHCK signal, the $UN_{Read}$ and, depending on the type of transaction:
- EMV mode: the transaction AC
- PayPass Magstripe mode: the transaction Track 2 Data
- nothing if the transaction failed at Reader 3 level Process R validates that $UN_{Read}$ matches its version of the UN derived as follows:

$UN_{Serv}=SHA-256[P_{Serv}]$

The $P_{Serv}$ used above is the value of $P_{Serv}$ stored in the session during the previous transaction's processing.

Process R then calculate the next value for $P_{Serv}$:
If the transaction used EMV mode
$P_{Serv}=SHA-256[TSC_{Serv}, P_{Serv}, AC]$
if the transaction used PayPass Mag Stripe mode
$P_{Serv}=SHA-256 [TSC_{Serv}, P_{Serv}, Track\ 2\ Data]$
if the transaction failed in the Reader 3, no transaction data (AC or Track 2) is available:
$P_{Serv}=SHA-256[TSC_{Serv}, P_{Serv}]$
This $P_{Serv}$ for the next TSC is stored in the session.

As Process R needs the $P_{Serv}$ calculated during the previous transaction, Process M and A have to make sure that Process R receives the transactions in the TSC order.

The requirements on the Unpredictable Number (UN) generation are defined in Section 8.1 of [READER] and the seed must be generated according to these principles.

Process R returns the result of this last check in the CHCK_REPLY signal to the Process A which originally requested the validation.

Process I

Process I is responsible for managing the configuration data in the Terminal 2 and the Reader 3.

Upon receiving the INIT signal from Process L, Process I will decide if the device (Terminal 2 and Reader 3) need to be updated, based on what configuration data were last sent to the device.

The content of the Reader 3 and Terminal databases have to be fully updated, if any of the following is true for the session's DeviceID:

ClerkID$_{Term}$≠ClerkID$_{LastLogon}$
MerchantID$_{Term}$≠MerchantID$_{LastLogon}$ ClerkID$_{Term}$ and MerchantID$_{Term}$ are read from the session and ClerkID$_{LastLogon}$ and MerchantID$_{LastLogon}$ from the current Device database record.

For the following individual parameters, only the values, modified since DateTime$_{LastLogon}$ for this Merchant-Device-Clerk tuple, have to be updated, but the database may be fully updated:

Terminal 2 or Reader 3 settings update
Clerk user rights changed
Device capabilities updated If Process I identifies that an update is required, it sends consecutive UPD signals containing the TLV values to be updated.

Process I includes the TLVs of the data which need to be updated in a template 'FF8111' or a template 'FF8122' or a combination of both; template 'FF8111' contains Terminal data while template 'FF8122' contains Reader 3 data.

The UPD signal is sent to the Terminal 2 through Process O which uses the key SK2 and the nonce S (RMC$_{Serv}$∥SMC$_{Serv}$) for CCM authenticated encryption, as described in Section 5. The Terminal 2 part of the message 'FF8111' is included in the unencrypted part of the message (A) and Reader 3 part 'FF8122' in the encrypted part (C).

The values that Process I can update in the Terminal 2 and Reader 3 database are the following:

In the Terminal database
  Terminal management data
  Generic Transaction data
  User interface settings, for the different input and output devices.
  Display Messages for the different languages
In the Reader's database
  Supported brands and related data
  Supported transaction types and related data
  Generic transaction related data After sending the necessary values, Process I changes the session's status to "Ready to transact" and indicates the end of the update sequence by sending an UPD signal to the Terminal 2 containing an Operational Status with its most significant bit set in the first byte.

Process I also updates following database values for the current Device:

MerchantID$_{Term}$→MerchantID$_{LastLogon}$
ClerkID$_{Term}$→ClerkID$_{LastLogon}$
DateTime$_{Term}$→DateTime$_{LastLogon}$ In case the Server 4 doesn't have any update for the Terminal 2 nor for the Reader 3, it only sets the sessions status to "ready to transact" and sends the UPD signal including the Operational Status with its most significant bit set in the first byte.

It is possible to add a consistency check between the device and Server 4 databases after the initialisation itself. It may however be more efficient to implement it in Process A. Process A would validate the most critical values of the database (limits and public keys) in each payment transaction sent by the Terminal 2 for authorisation and clearing.

Process M

Process M on the Server 4 is responsible for managing the other processes and routing the incoming transactions to the Process A which are capable of handling them. It also dispatches the STOP signals in case of problem.

Upon receiving from Process O an AUTH or a NOT signal with the Protected Transaction Data (tag 'FF8132') included, Process M will:

if a transaction with the same TSC (EMV Tag 9F41) is present in its Transaction history:
  If TSC$_{Read}$>TSC$_{Serv}$+1, and if the previous signal was an AUTH and the new signal is a NOT: replace the AUTH signal by the NOT signal in the Transaction History.
  If TSC$_{Read}$≤TSC$_{Serv}$:
    If the transaction content is different from the one already stored, this signal most probably correspond to a replay attack. Process M rejects the transaction, sends a STOP signal (more details at the end of this section) to the Terminal 2 and closes the session.
    Otherwise, Terminal's Process B didn't receive the response signal already sent, so Process M resends the CONF and/or AUTH_REPLY signals stored in the history.
if the transaction is new, store it in the session with TSC$_{Read}$ as search key and:
  If TSC$_{Read}$>TSC$_{Serv}$+1, Process M sets the transaction status to "Pending".
  If TSC$_{Read}$=TSC$_{Serv}$+1:
    extract the RID (retrieved from the ADF Name—tag '4F', included in the Discretionary Data—tag 'FF8106') and the AID set by the Reader 3 in the transaction data, map it with the Process A that can handle the transaction and forward it unchanged.
    if there are "Pending" transactions in the Transaction History with a TSC$_{Read}$ directly following this new transaction, Process M sends, in ascending TSC order, the remaining "Pending" transactions to the corresponding Processes A, until a new gap appears in the TSCs.
    Each transaction sent to a Process A is labelled "In progress".
  If TSC$_{Read}$<TSC$_{Serv}$: This isn't possible as all transactions up to TSC$_{Serv}$ were received and stored in the Transaction History.

When receiving the CONF message from Process A, Process M will forward it to the Terminal 2 via Process O and Process C.

When Process M receives a NOT signal containing a signature, it sends it to the Process A which processed the corresponding transaction (same TSC$_{Read}$). If the transaction wasn't received before the signature, it stores the signature in the transaction history and sends it to Process A just after sending the transaction.

Upon receiving the STOP signal, Process M will forward it to Process L, Process I and Process A. If the signal was coming from one of the Server's Processes, Process M also forwards the STOP signal to the Terminal 2. If the key SK2$_{Serv}$ is known, the STOP signal is sent with a 'FF8122' template. Otherwise, it is sent with a 'FF8110' template. Process M will reject any new AUTH or CONF signals. When all transactions are processed and tagged as such in the session, Process M closes the current session, deletes the database elements related to this session (marked Session in the section 8.2) and activates Process C for a new session to start.

Process A

Process A is responsible for authenticating and authorizing the transaction data coming from the Terminal 2. There may be different Processes A on the Server 4 for the different kernels available on the Terminal 2 to handle the different types of cards. The mapping process in Process M will ensure that a version of Process A only receives transaction data that it can handle.

Process A is in charge of:
  performing offline card authentication, in particular perform CDA as described in [EMV]
  authorizing transactions offline or online with the issuer
  handling any digitized signatures captured on the Terminal and sent after the AUTH signal.

When Process A receives a new transaction in an AUTH or a NOT signal with the Protected Transaction Data (tag 'FF8132'), it must:
  extract the UN (EMV Tag 9F37) and enclose it along with the Application Cryptogram (EMV Tag 9F26) or the Track 2 Data (EMV Tag 9F26) depending on the type of transaction, in a CHCK signal for validation by Process R
  if the UN is invalid:
    send a CONF signal with the Outcome Parameter Set (Tag 'DF8129') set to END APPLICATION in a 'FF8111' template. It must also contain the original TSC for identification by the Terminal 2.
    set transaction's status to "Failed"
    store the CONF signal in the Transaction history, send a STOP signal to Process M and stop
  If the transaction doesn't have an AC or a Track 2 Data
    set the transaction status to "Failed"
    send a CONF signal to the Terminal 2 with the original TSC for identification by the Terminal 2 in a 'FF8111' template.
    process next transaction
  if the transaction is in a NOT signal:
    if it was declined by the Terminal 2:
      set the transaction status to "Failed"
      send a CONF signal to the Terminal 2 with the original TSC for identification by the Terminal 2 in a 'FF8111' template.
      process next transaction
    if it was approved by the Reader 3, Process A removes the Outcome Parameter Set (Tag 'DF8129') as it will be re-evaluated.
  authenticate the transaction and get the authorization:
    if online: send the transaction unchanged to the issuer for authentication and authorization
    if online with mPIN CVM: validate the CDA (more details bellow) and forward the transaction online to the issuer
    offline: validate the CDA (more details bellow) and set the Outcome Parameter Set (Tag 'DF8129')
  if the transaction isn't authenticated:
    send an AUTH_REPLY signal to the Terminal 2 with the Outcome Parameter Set (Tag 'DF8129') with the Outcome Parameter Set (Tag 'DF8129') set to END APPLICATION in a FF8111 template. It must also contain the original TSC for identification by the Terminal 2.
    set transaction's status to "Failed"
    store the AUTH_REPLY signal in the Transaction history, send a STOP signal to Process M and stops
  if the authorization was sent online:
    send a CONF signal to the Terminal 2 with the Outcome Parameter Set (Tag 'DF8129') with the Outcome Parameter Set (Tag 'DF8129') set to "ONLINE REQUEST" in a FF8111 template. It must also contain the original TSC for identification by the Terminal 2.
    store the CONF signal in the Transaction history
    set transaction's status to "Sent online".
  if the transaction was authorized offline
    send an AUTH_REPLY signal to the Terminal 2 with the Outcome Parameter Set (Tag 'DF8129') contains APPROVE or DECLINE in a FF8111 template. It must contain:
      The original TSC for identification by the Terminal 2
      The Authorization Response Code
      The Authorization Code for the receipt
    store the AUTH_REPLY signal in the Transaction history
    set transaction's status to "Authorized"
  Sets TSC$_{Serv}$ in the session to the TSC$_{Read}$ of the transaction.

When the authorization was forwarded online, upon receiving the authorization message from the issuer and if the corresponding transaction status is "Sent Online", Process A creates an AUTH_REPLY message including in a FF8111 template:
  The original TSC
  The authorization outcome in the Outcome Parameter Set (Tag DF8129): APPROVE, DECLINE or END APPLICATION (if a problem occurred)
  The Authorization Response Code
  The Authorization Code for the receipt
  The AUTH_REPLY is stored in the Transaction history and its status is set to "Authorized".

If the cardholder was verified with a digitized signature, Process A receives this signature in a NOT signal identified by its TSC. This signal coming from the Reader 3 is authenticated and decrypted by process O. The signature is stored with the transaction in the Transaction history.

After sending the AUTH_REPLY signal of a transaction, if the transaction was approved, Process A creates a CLEAR signal containing all the transaction data, sends it to Process Q for asynchronous clearing and sets the transaction status to "Processed".

Upon receiving a STOP signal from Process M, Process A rejects any new transaction but finishes processing all the transaction currently queued in the session until all transactions in the History are tagged either "Processed" or "Failed".

CDA Validation

To authenticate (or re-authenticate) the transaction, the Server 4 will validate the CDA calculation made by the device, following [EMV]. To do so, the Server 4 is configured with the Payment System Public Key and will receive from the Reader 3 the following non-sensitive data, in the transaction (Tag FF810A):
  CA Public Key Index ('8F')
  Issuer Public Key Certificate ('90')
  Issuer Public Key Remainder ('92')

Issuer Public Key Exponent ('9F32')
ICC Public Key Remainder ('9F48')
ICC Public Key Exponent ('9F47')
Process Q Process Q is in charge of clearing the transaction after authorization by Process A.

Upon receiving the CLEAR signal from Process A, Process Q will add the transaction included in the signal to its FIFO queue of transactions to be cleared. This queue is independent of the other processes session and processes all the transactions from the different sessions.

As long as the transaction queue contains transactions to be cleared, Process Q sends them in a FIFO order to the acquirer host for clearing.

8.2 Database

Figure 25:
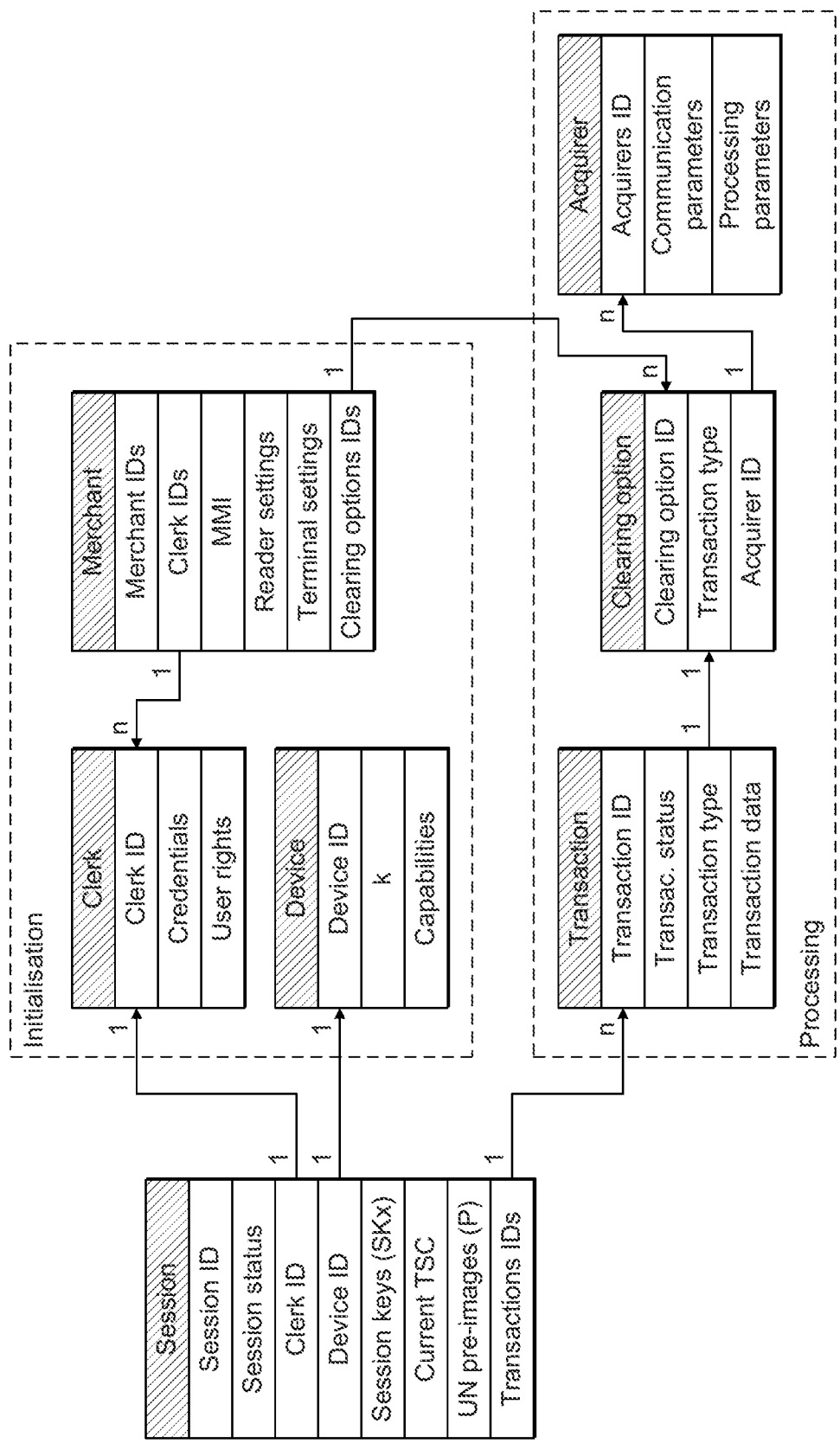
FIG. 25 shows information stored in the Server database according to an embodiment.

For the topology of the Server 4 data, the following organization is taken:
- A Merchant ID identifies a Merchant and one or more accounts (identifiers) at one or more acquirers. The selection criteria for the account—and therefore the acquirer—are indicated at the level of the account.
- A Merchant may have multiple Clerks, each identified by a Clerk ID, Logon credentials and user rights.
- A Clerk operates one of multiple mobile device 1, each with it Device ID and capabilities.
- See FIG. 25.

The combination of the Merchant Terminal 2 and Reader 3 settings, the user rights and the device capabilities is used by Process I to determine the Reader 3 and Terminal 2 configuration.

A session is therefore the combination of a Clerk logged in with a certain Device.

The Server 4 database contains both data to configure its processes and data used to update the Terminal 2 and Reader 3 software and databases.

10. Network Logon Security

The present section details the mechanisms used in Logon and Authentication. Tokens are used as One Time Passwords using date & time for logon and a challenge/response for Reader Authentication. The Challenge used is the UN Seed.

The Reader 3 also generates two session keys from a set of random data. The random data is sent back to the Server 4 along with the Authentication Token as a single protected data item using RSA_OAEP. The key used for this is hard coded into the reader application.

10.1 Token

The calculation of a Token is performed as follows. This is a variant on HOTP as defined in RFC4226 in that the final decimalisation stage is not used and the truncation returns the lowest 32 bits instead of 31 bits:
1. HMAC(k, c)=SHA-256(k⊕'5C5C . . . 5C'||SHA-256 (k⊕'3636 . . . 36'||c))
2. Token(k, c)=HMAC(k,c) & 0xFFFFFFFF in other words return the least significant 32 bits as a 4 byte value.

Whilst HOTP normally uses SHA-1, SHA-256 is used here.

To protect against brute force attacks, Throttling as defined in RFC4226 must be implemented.

The Server 4 must keep a record of the last date and time used by a mobile and reject Logons with an earlier date and time and also implement a short time windows for acceptable deviation from its notion of date and time. The date and time must be communicated to the Server 4 as part of the logon.

It must not be possible for any valid date and time to be the same as a value for UN_Seed. The format of date+time is an ASCII string yyyymmddhhmmss of UTC. Hence 10:23:45 on the 14$^{th}$ May 2012 would be the ASCII string "20120514102345"

10.2 HMAC-SHA-256

HMAC is defined in [ISO/IEC 9797-2] as MAC Algorithm 2. It is used in conjunction with SHA-256.

10.3 RSA-OAEP

RSA OAEP is defined as RSAES in [ISO/IEC 18033-2]. In this implementation, the Hash used is SHA-256 and the KDF is KDF1.

As used here, a random value is generated that is used for the session keys. Its length is such as to fill the available space as defined by the RSA modulus in use less the 4 bytes needed for the Token. It must be at least 256 bits long.

11. Encryption of Data

Please note that although the present document has described the use of CCM Mode with AES, in embodiments an alternative mode may be selected instead.

The present section describes the method used to protect transaction data from Reader 3 to Server 4 and to protect database updates between Server 4 and Reader 3.

The Data will be protected with AES with CCM mode as described in [ISO/IEC 19772] Authenticated Encryption mechanism 3.

11.1 Protection of Data

The Reader 3 must protect the transaction data against modification or eavesdropping so that it may be sent securely to the Server 4. It is therefore protected between Reader Process M and Server Process A.

The Reader 3 must be certain that configuration data is authentic. Such data is therefore protected between Server process A and Reader process M using the mechanisms described here. Data updates to the Terminal 2 are also included in the authentication in order to permit the Terminal 2 to use the Reader 3 to ensure authenticity of configuration data.

Encryption Specification

The mode of operation described in [ISO/IEC 19772] Authenticated Encryption mechanism 3 shall be used with the parameters provided in Table 9.

TABLE 9

| Parameter | Value | Comments |
| --- | --- | --- |
| t | 64 (bits) | An 8 byte MAC |
| w | 4 (bytes) | Maximum message length $2^{32}$ bytes |
| Length of S | 11 (bytes) | 11 byte Starting Variable (nonce)—a consequence of the choice of 4 for w. The Starting Value will be incremented before each message that is encrypted. |
| A | Data to be Authenticated | This data is included in the MAC but is not encrypted |
| D | Data to be encrypted | This data is included in the MAC and also encrypted |

The algorithm used is AES with 128 bit keys.

12. Unpredictable Numbers

Unpredictable Numbers are used to ensure freshness in transactions.

The UNs produced by process K will be MACd by the cardholder device and validated by the Issuer but there are two concerns:

The Merchant device may not generate good UNs

There may be a man-in-the-middle between the Server 4 and Terminal 2.

In embodiments, a seed is produced for the Reader 3 by the Server 4 which the Reader 3 will use in a deterministic fashion to generate UNs.

The seed will be refreshed with a new seed whenever a new communications session is established with the Terminal 2.

The Server 4 will validate that the UN is as expected and if not it will reject the transaction and inform the Merchant that it has been rejected. This will be the responsibility of Server process A using process U to perform the generation of a seed and the checking of a UN from a transaction.

In order for the Server 4 to maintain synchronisation, it is important that all transactions are sent to the Server 4 and that they are sent in sequence. Also it is important that a failed transaction in the Terminal 2 does not result in a loss of synchronisation.

To do this, the Transaction Sequence Counter (EMV Tag '9F41'), Seed, ID and card furnished data are used as part of the process. The Transaction Sequence Counter is initialized and managed by Process K in the Reader 3. The process operates as follows Precursor: An identity (ID) exists that is known by the Terminal 2 and Server 4 that is not communicated over the air.

1. A 16 byte binary value random string is generated in Process R and sent from the Server 4 to the Terminal 2. The quality of the seed generation must follow the principles described in Section 9.1 of the V3 Reader 3 specification.
2. Process R generates its own copy of the expected value for P for the first transaction based on the seed and an ID. The ID is not sent to the Terminal 2.
3. When a seed is received by Process O, a value P is set as SHA-256[Seed∥ID]
4. The transaction sequence counter shall be incremented for each transaction as described in [EMV Book 4] Section 6.5.5
5. The UN used for a transaction will not vary between DOLs and will comprise the least significant 4 bytes of SHA-256[P]. This UN value is used for both chip transactions (e.g. EMV transactions) and mag stripe transactions (also referred to herein Mag Stripe or MagStripe transactions).
6. At the end of a transaction where an AC was obtained, the value of P is set to SHA-256[Transaction Sequence Counter∥P∥AC]
7. At the end of a transaction where dynamic CVC data was obtained, the value of P is set to SHA-256[Transaction Sequence Counter∥P∥PayPass modified track 2 data]
8. If a transaction fails, so that Track 2 data or an AC is not available, the above calculations are still performed but AC or Track 2 Data are omitted. So the value of P is set to SHA-256[Transaction Sequence Counter∥P].
9. Process K must never perform steps 5 or 6 if it will not send the transaction data to the Server 4. There is no need for transactions that do not generate an AC or CVC data to be sent to the Server 4 as the Server 4 will resynchronise its version of P with that of the Reader 3 based on the value of the Transaction Sequence Counter that it receives.
10. The Server process A will receive the transaction outcome. Once decrypted and the MAC verified, it will send to process U the Transaction Sequence Counter and either the AC or the Track 2 Data.
11. Server process U will check that the sequence counter is higher than the last value (unless this is the first transaction since reinitialisation), and recover the expected seed value and ID. If there is a gap in the Server's last seen value for the Transaction Sequence Counter and the new value it must repeat step 7 until resynchronised.
12. Process U will check the UN is as expected, update its copy of Transaction Sequence Counter and replace P with a new value calculated as per steps 5 or 6.

In the event of a loss of synchronisation the transaction should be rejected and a new session established by logging on again to the Server 4 with Merchant authentication.

13. Modifications and Variations

A number of modifications and variations of the implementation of IC-MPOS described herein can be made without departing from embodiments of the invention as defined by the appended claims.

For example, the mobile device of a Merchant may be registered with a plurality of MPOS Solution Providers and be able to use different MPOS Solution Providers for different purposes. This can be realised by the mobile device 1 determining which of a plurality of Servers 4 has sent each communication and establishing separate and different session keys and pre-image for each Server 4.

The payment device of a customer may be, for example, a mobile device (e.g. a portable telephone or PDA) or a contactless payment card. Information is transferred over a wireless link to a mobile device of a Merchant during a payment transaction.

In addition, alternative logical partitioning and physical architectures to those described herein may be used to realise embodiments.

In addition, the techniques described herein for communicating between Reader 3, Terminal 2 and Server 4 applications may also be applied in MPOS systems other than IC-MPOS to improve their security.

The flow charts and descriptions thereof herein should not be understood to prescribe a fixed order of performing the method steps described therein. Rather, the method steps may be performed in any order that is practicable. Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

The invention claimed is:

1. A method for secure communication with a mobile device, wherein the mobile device comprises a terminal, the method comprising:

transmitting, by the terminal of the mobile device to a server, a logon request over a first encrypted channel, wherein the logon request comprises information for authenticating the terminal and information for logging onto the server;

receiving, by the mobile device from the server via a communications network over the first encrypted channel, two seed numbers generated by the server in response to successful authentication of the terminal, the two seed numbers being unique to the successful authentication of the terminal to the server;

generating, by the mobile device: (i) two session keys, in dependence on one or more of the received two seed numbers from the server, for use in encrypted communication over a second encrypted channel, the first session key being used for encrypted communication from the mobile device to the server and the second session key being used for encrypted communication from the server to the mobile device, (ii) a pre-image, by hashing one of the received of the two seed numbers from the server and identification information of the mobile device, and (iii) a first unpredictable number for use in the encrypted communication over the second encrypted channel between the server and the mobile device, the first unpredictable number being a hash of the generated pre-image, and transmitting transaction data from the mobile device to the server over the second encrypted channel and the two session keys with subsequent unpredictable numbers, the subsequent unpredictable numbers being based on the pre-image and a sequence of customer transactions including successful and failed customer transactions.

2. The method of claim 1, wherein the mobile device comprises a reader and a terminal, the method further comprising:
communicating between the reader and the server via the terminal.

3. The method of claim 2, further comprising:
transmitting, by the terminal, information comprising the two seed numbers received from the server to the reader;
generating, by the reader, a random number;
generating, by the reader, a first session key (SK2) in dependence on a first part of the random number and one of the received one or more seed numbers; and
generating, by the reader, a second session key (SK3) in dependence on a second part of the random number and one of the received one or more seed numbers.

4. The method of claim 2, further comprising:
generating, by the reader, said pre-image in dependence on one of the received two seed numbers from the server and identification information of the reader; and
generating a first unpredictable number in dependence on the generated pre-image.

5. The method of claim 2, further comprising:
generating, by the reader, a new pre-image in dependence on the pre-image, the value of a transaction sequence counter and received user data used for the previous transaction; and
generating, by the reader, a new unpredictable number for use in the next transaction in dependence on said new pre-image.

6. The method of claim 1, wherein the mobile device further comprises a reader located in a secure zone of the mobile device, wherein the generating (i) said two session keys and (ii) said pre-image is performed by the reader of the mobile device.

7. The method for secure communication with a mobile device of claim 6, further comprising:
receiving, by the reader of the mobile device and in a contactless manner, payment card data from one of: (i) a physical payment card and (ii) a second mobile device storing payment card data; and transmitting, from the reader of the mobile device and to the server, an encrypted message, wherein the encrypted message comprises information from which the server can authenticate the payment card.

8. A method of operating a server for secure communication with a mobile device, the method comprising:
receiving a log on request from a mobile device over a first encrypted channel;
authenticating the mobile device from the received log on request;
transmitting over the first encrypted channel, in response to successful authentication of the mobile device, two seed numbers generated by the server to the mobile device, the two seed numbers being unique to the successful authentication of the mobile device to the server;
receiving over the first encrypted channel, from the mobile device via a communications network, in response to the server transmitting the two seed numbers to the mobile device, encrypted information comprising a random number;
decrypting the received encrypted information to obtain said random number;
generating: (i) two session keys, in dependence on said random number and one or more of said two seed numbers, for encrypted communication over a second encrypted channel, the first session key being used for encrypted communication from the mobile device to the server and the second session key being used for encrypted communication from the server to the mobile device, (ii) a pre-image, by hashing one of the two seed numbers and identification information of the mobile device, and (iii) a first unpredictable number for use in the encrypted communication over the second encrypted channel with the mobile device, the first unpredictable number being a hash of the generated pre-image; and
receiving transaction data with the unpredictable number from the mobile device over the second encrypted channel and the two session keys with subsequent unpredictable numbers, the subsequent unpredictable numbers being based on the pre-image and a sequence of customer transactions including successful and failed transactions.

9. A mobile device comprising processing and operating means with executable instructions which on execution cause the mobile device to perform a method for secure communication with the mobile device, the method comprising:
transmitting, by a terminal of the mobile device to a server, a logon request over a first encrypted channel, wherein the logon request comprises information for authenticating the terminal and information for logging onto the server;
receiving, by the mobile device from the server via a communications network over the first encrypted channel, two seed numbers generated by the server in response to successful authentication of the terminal, the two seed numbers being unique to the successful authentication of the terminal to the server;
generating, by the mobile device: (i) two session keys, in dependence on one or more of the received two seed numbers from the server, for use in encrypted communication over a second encrypted channel, the first session key being used for encrypted communication from the mobile device to the server and the second session key being used for encrypted communication from the server to the mobile device, (ii) a pre-image, by hashing one of the received of the two seed numbers from the server and identification information of the mobile device, and (iii) a first unpredictable number for use in the encrypted communication over the second encrypted channel between the server and the mobile device, the first unpredictable number being a hash of the generated pre-image, and transmitting transaction data from the mobile device to the server over the second encrypted channel and the two session keys with subsequent unpredictable numbers, the subsequent unpredictable numbers being based on the pre-image and a sequence of customer transactions including successful and failed customer transactions.

10. A mobile device comprising processing and operating means with executable instructions which on execution cause the mobile device to perform a method for secure communication with the mobile device, the method comprising:

transmitting, by a terminal of the mobile device to a server, a logon request over a first encrypted channel, wherein the logon request comprises information for authenticating the terminal and information for logging onto the server;

receiving, by the mobile device from the server via a communications network over the first encrypted channel, two seed numbers generated by the server in response to successful authentication of the terminal, the two seed numbers being unique to the successful authentication of the terminal to the server;

generating, by the mobile device: (i) two session keys, in dependence on one or more of the received two seed numbers from the server, for use in encrypted communication over a second encrypted channel, the first session key being used for encrypted communication from the mobile device to the server and the second session key being used for encrypted communication from the server to the mobile device, (ii) a pre-image, by hashing one of the received of the two seed numbers from the server and identification information of the mobile device, and (iii) a first unpredictable number for use in the encrypted communication over the second encrypted channel between the server and the mobile device, the first unpredictable number being a hash of the generated pre-image, and transmitting transaction data from the mobile device to the server over the second encrypted channel and the two session keys with subsequent unpredictable numbers, the subsequent unpredictable numbers being based on the pre-image and a sequence of customer transactions including successful and failed customer transactions;

wherein the mobile device further comprises a reader located in a secure zone of the mobile device, wherein the generating (i) said two session keys and (ii) said pre-image is performed by the reader of the mobile device.

11. A server comprising processing and operating means with executable instructions which on execution cause the server to perform a method of operating the server for secure communication with a mobile device, the method comprising:

receiving a log on request from the mobile device over a first encrypted channel;

authenticating the mobile device from the received log on request;

transmitting over the first encrypted channel, in response to successful authentication of the mobile device, two seed numbers generated by the server to the mobile device, the two seed numbers being unique to the successful authentication of the mobile device to the server;

receiving over the first encrypted channel, from the mobile device via a communications network, in response to the server transmitting the two seed numbers to the mobile device, encrypted information comprising a random number;

decrypting the received encrypted information to obtain said random number;

generating: (i) two session keys, in dependence on said random number and one or more of said two seed numbers, for encrypted communication over a second encrypted channel, the first session key being used for encrypted communication from the mobile device to the server and the second session key being used for encrypted communication from the server to the mobile device, (ii) a pre-image, by hashing one of the two seed numbers and identification information of the mobile device, and (iii) a first unpredictable number for use in the encrypted communication over the second encrypted channel with the mobile device, the first unpredictable number being a hash of the generated pre-image; and receiving transaction data with the unpredictable number from the mobile device over the second encrypted channel and the two session keys with subsequent unpredictable numbers, the subsequent unpredictable numbers being based on the pre-image and a sequence of customer transactions including successful and failed transactions.

12. A mobile communications system comprising a server and a mobile device with executable instructions which on execution cause the server and mobile device to perform a method for secure communication with the mobile device, the method comprising:

transmitting, by a terminal of the mobile device to the server, a logon request over a first encrypted channel, wherein the logon request comprises information for authenticating the terminal and information for logging onto the server;

receiving, by the mobile device from the server via a communications network over the first encrypted channel, two seed numbers generated by the server in response to successful authentication of the terminal, the two seed numbers being unique to the successful authentication of the terminal to the server;

generating, by the mobile device: (i) two session keys, in dependence on one or more of the received two seed numbers from the server, for use in encrypted communication over a second encrypted channel, the first session key being used for encrypted communication from the mobile device to the server and the second session key being used for encrypted communication from the server to the mobile device, (ii) a pre-image, by hashing one of the received of the two seed numbers from the server and identification information of the mobile device, and (iii) a first unpredictable number for use in the encrypted communication over the second encrypted channel between the server and the mobile device, the first unpredictable number being a hash of the generated pre-image, and transmitting transaction data from the mobile device to the server over the second encrypted channel and the two session keys with subsequent unpredictable numbers, the subsequent unpredictable numbers being based on the pre-image and a sequence of customer transactions including successful and failed customer transactions.

13. A mobile communications system comprising a server and a mobile device with executable instructions which on execution cause the server and mobile device to perform a method of operating the server for secure communication with the mobile device, the method comprising:

receiving a log on request from the mobile device over a first encrypted channel;

authenticating the mobile device from the received log on request;

transmitting over the first encrypted channel, in response to successful authentication of the mobile device, two seed numbers generated by the server to the mobile device, the two seed numbers being unique to the successful authentication of the mobile device to the server;

receiving over the first encrypted channel, from the mobile device via a communications network, in response to the server transmitting the two seed numbers to the mobile device, encrypted information comprising a random number;

decrypting the received encrypted information to obtain said random number;

generating: (i) two session keys, in dependence on said random number and one or more of said two seed numbers, for encrypted communication over a second encrypted channel, the first session key being used for encrypted communication from the mobile device to the server and the second session key being used for encrypted communication from the server to the mobile device, (ii) a pre-image, by hashing one of the two seed numbers and identification information of the mobile device, and (iii) a first unpredictable number for use in the encrypted communication over the second encrypted channel with the mobile device, the first unpredictable number being a hash of the generated pre-image; and receiving transaction data with the unpredictable number from the mobile device over the second encrypted channel and the two session keys with subsequent unpredictable numbers, the subsequent unpredictable numbers being based on the pre-image and a sequence of customer transactions including successful and failed transactions.

14. A mobile communications system comprising a server and a mobile device with executable instructions which on execution cause the server and mobile device to perform a method for secure communication with the mobile device, the method comprising:

transmitting, by a terminal of the mobile device to the server, a logon request over a first encrypted channel, wherein the logon request comprises information for authenticating the terminal and information for logging onto the server;

receiving, by the mobile device from the server via a communications network over the first encrypted channel, two seed numbers generated by the server in response to successful authentication of the terminal, the two seed numbers being unique to the successful authentication of the terminal to the server;

generating, by the mobile device: (i) two session keys, in dependence on one or more of the received two seed numbers from the server, for use in encrypted communication over a second encrypted channel, the first session key being used for encrypted communication from the mobile device to the server and the second session key being used for encrypted communication from the server to the mobile device, (ii) a pre-image, by hashing one of the received of the two seed numbers from the server and identification information of the mobile device, and (iii) a first unpredictable number for use in the encrypted communication over the second encrypted channel between the server and the mobile device, the first unpredictable number being a hash of the generated pre-image, and transmitting transaction data from the mobile device to the server over the second encrypted channel and the two session keys with subsequent unpredictable numbers, the subsequent unpredictable numbers being based on the pre-image and a sequence of customer transactions including successful and failed customer transactions;

wherein the mobile device further comprises a reader located in a secure zone of the mobile device, wherein the generating (i) said two session keys and (ii) said pre-image is performed by the reader of the mobile device.

* * * * *